United States Patent
Qiao et al.

(10) Patent No.: US 10,785,637 B2
(45) Date of Patent: Sep. 22, 2020

(54) SMF SELECTION FOR ISOLATED NETWORK SLICE

(71) Applicants: Weihua Qiao, Herndon, VA (US); Esmael Dinan, McLean, VA (US); Kyungmin Park, Herndon, VA (US); Peyman Talebi Fard, Sterling, VA (US)

(72) Inventors: Weihua Qiao, Herndon, VA (US); Esmael Dinan, McLean, VA (US); Kyungmin Park, Herndon, VA (US); Peyman Talebi Fard, Sterling, VA (US)

(73) Assignee: Ofinno, LLC, Reston, VA (US)

( * ) Notice: Subject to any disclaimer, the term of this patent is extended or adjusted under 35 U.S.C. 154(b) by 2 days.

(21) Appl. No.: 16/195,231

(22) Filed: Nov. 19, 2018

(65) Prior Publication Data
US 2019/0159015 A1 May 23, 2019

Related U.S. Application Data
(60) Provisional application No. 62/587,997, filed on Nov. 17, 2017.

(51) Int. Cl.
*H04L 29/08* (2006.01)
*H04W 8/06* (2009.01)
(Continued)

(52) U.S. Cl.
CPC ........... *H04W 8/14* (2013.01); *H04L 41/0893* (2013.01); *H04L 67/143* (2013.01); *H04L 67/148* (2013.01); *H04W 8/065* (2013.01); *H04W 60/04* (2013.01)

(58) Field of Classification Search
None
See application file for complete search history.

(56) References Cited

U.S. PATENT DOCUMENTS

2017/0317894 A1* 11/2017 Dao .................... H04L 41/5012
2017/0332421 A1* 11/2017 Sternberg .............. H04W 12/06
(Continued)

FOREIGN PATENT DOCUMENTS

WO  WO-2018153470 A1 *  8/2018  ............ H04W 48/18

OTHER PUBLICATIONS

S2-175581; SA WG2 Meeting #122-bis; Aug. 21-25, 2017, Sophia Antipolis, France (was S2-17xxxx); Source: Samsung; Title: Pushing slice coexistence information to the UE.
(Continued)

*Primary Examiner* — Ajit Patel
(74) *Attorney, Agent, or Firm* — David Grossman; Kavon Naabzadeh; Philip Smith

(57) ABSTRACT

An access and mobility management function receives a registration request for a wireless device from a radio access network. The access and mobility management function sends a first message to a network repository function in response to receiving the registration request. The first message comprises: at least one single network slice selection assistance information of at least one network slice; and network slice isolation information for the at least one single network slice selection assistance information. The access and mobility management function receives from the network repository function, a second message comprising an Internet protocol address of a session management function. The session management function is selected based on the network slice isolation information for the at least one single network slice selection assistance information. The access and mobility management function sends a session create request for the wireless device to the session management function.

19 Claims, 25 Drawing Sheets

(51) Int. Cl.
*H04W 8/14* (2009.01)
*H04L 12/24* (2006.01)
*H04W 60/04* (2009.01)

(56) References Cited

U.S. PATENT DOCUMENTS

| | | | | |
|---|---|---|---|---|
| 2018/0139107 | A1* | 5/2018 | Senarath | H04L 41/5003 |
| 2019/0166647 | A1* | 5/2019 | Velev | H04W 76/11 |
| 2019/0174573 | A1* | 6/2019 | Velev | H04W 76/12 |
| 2019/0191349 | A1* | 6/2019 | Kim | H04W 36/0022 |
| 2019/0208573 | A1* | 7/2019 | Yang | H04L 41/042 |
| 2019/0357129 | A1* | 11/2019 | Park | H04W 88/14 |
| 2019/0364541 | A1* | 11/2019 | Ryu | H04W 76/25 |

OTHER PUBLICATIONS

S2-175601; SA WG2 Meeting #122bis; Aug. 21-25, 2017, Sophia Antipolis, France (revision of S2-17xxxx); Source: Telecom Italia, KDDI, ZTE; Title: 23.501: Network Slice isolation.

S2-175675; SA WG2 Meeting #122b; Aug. 21-25, 2017, Sophia Antipolis, France (was S2-17xxxx); Source: Ericsson; Title: Network Slice Co-existence considerations.

S2-175630; SA WG2 Temporary Document; 3GPP SA WG2 TD; SA WG2 Meeting #122bis S2-175630 Aug. 21-25, 2017, Sophia Antipolis, France (revision of S2-17xxxx); Source: Telecom Italia, ZTE Title: Network Slice coexistence.

S2-175678; SA WG2 Meeting #122bis; Aug. 21-25, Sophia Antipolis, France (was S2-17xxxx); Source: Nokia, Alcatel-Lucent Shanghai Bell; Title: On Coexistence rules.

S2-175757; SA WG2 Meeting #122bis; Aug. 21-25, 2017, Sophia Antipolis, France (was S2-17xxxx); Source: Qualcomm Incorporated; Title: TS 23.501: Support for slice co-existence.

S2-175911; SA WG2 Meeting #122 Bis; Aug. 21-25, 2017, Sophia Antipolis, France; Source: Huawei, HiSilicon Title: Simple slice coexistence.

S2-175915; SA WG2 Meeting #112bis; Aug. 21-25, 2017, Sophia Antipolis, France (revision of S2-17xxxx); Source: ZTE, Oracle; Title: 23.501: Network Slicing clause 5.15.5—Early vs. Late Binding of UE with the associated NSI corresponding to Allowed S-NSSAI.

* cited by examiner

| IE/Group Name | Presence | Range | IE type and reference | Semantics description |
|---|---|---|---|---|
| S-NSSAI | | | | |
| >SST | M | | OCTET STRING (SIZE (1)) | Slice/Service type (SST) refers to the expected network slice behaviour in terms of features and services |
| >SD | O | | OCTET STRING (SIZE (3)) | Slice Differentiator (SD) complements the Slice/Service type(s) to differentiate amongst multiple Network Slices of the same Slice/Service type. |
| >NSIT | O | | ENUMERATED (fully isolated, partly isolated with (R)AN shared, partly isolated with (R)AN and AMF shared) | Network Slice Isolation Type (NSIT) indicates the type/level of the network slice isolation applied to the S-NSSAI and/or the S-NSSAI related network slice instance (s). |

FIG. 21

| IE/Group Name | Presence | Range | IE type and reference | Semantics description |
|---|---|---|---|---|
| Network Slice Isolation Type (NSIT) | O | | ENUMERATED (fully isolated, partly isolated with (R)AN shared, partly isolated with (R)AN and AMF shared) | Network Slice Isolation Type (NSIT) indicates the type/level of the network slice isolation applied to the S-NSSAI and/or the S-NSSAI related network slice instance (s). |

FIG. 22

Receive, by an network repository function from an AMF, a 1st message indicating a request to select a session management function, the 1st message comprising: single network slice selection assistance information(s) of network slice(s); and network slice isolation information of the single network slice selection assistance information(s)
2410

Select, by the network repository function, the session management function based on the network slice isolation information for the single network slice selection assistance information(s)
2420

Send, by the network repository function to the access and mobility management function, a 2nd message comprising an Internet protocol address of the session management function
2430

FIG. 24

SMF SELECTION FOR ISOLATED NETWORK SLICE

CROSS-REFERENCE TO RELATED APPLICATIONS

This application claims the benefit of U.S. Provisional Application No. 62/587,997, filed Nov. 17, 2017, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 21 is a table depicting network slice isolation information as per an aspect of an embodiment of the present disclosure.

FIG. 22 is a table depicting network slice isolation information as per an aspect of an embodiment of the present disclosure.

FIG. 24 is a flow diagram of an aspect of an embodiment of the present disclosure.

DETAILED DESCRIPTION OF EXAMPLES

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for SMF Selection for Isolated Network Slice in communication systems. Throughout the present disclosure, UE, wireless device, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably.

Figure 1:
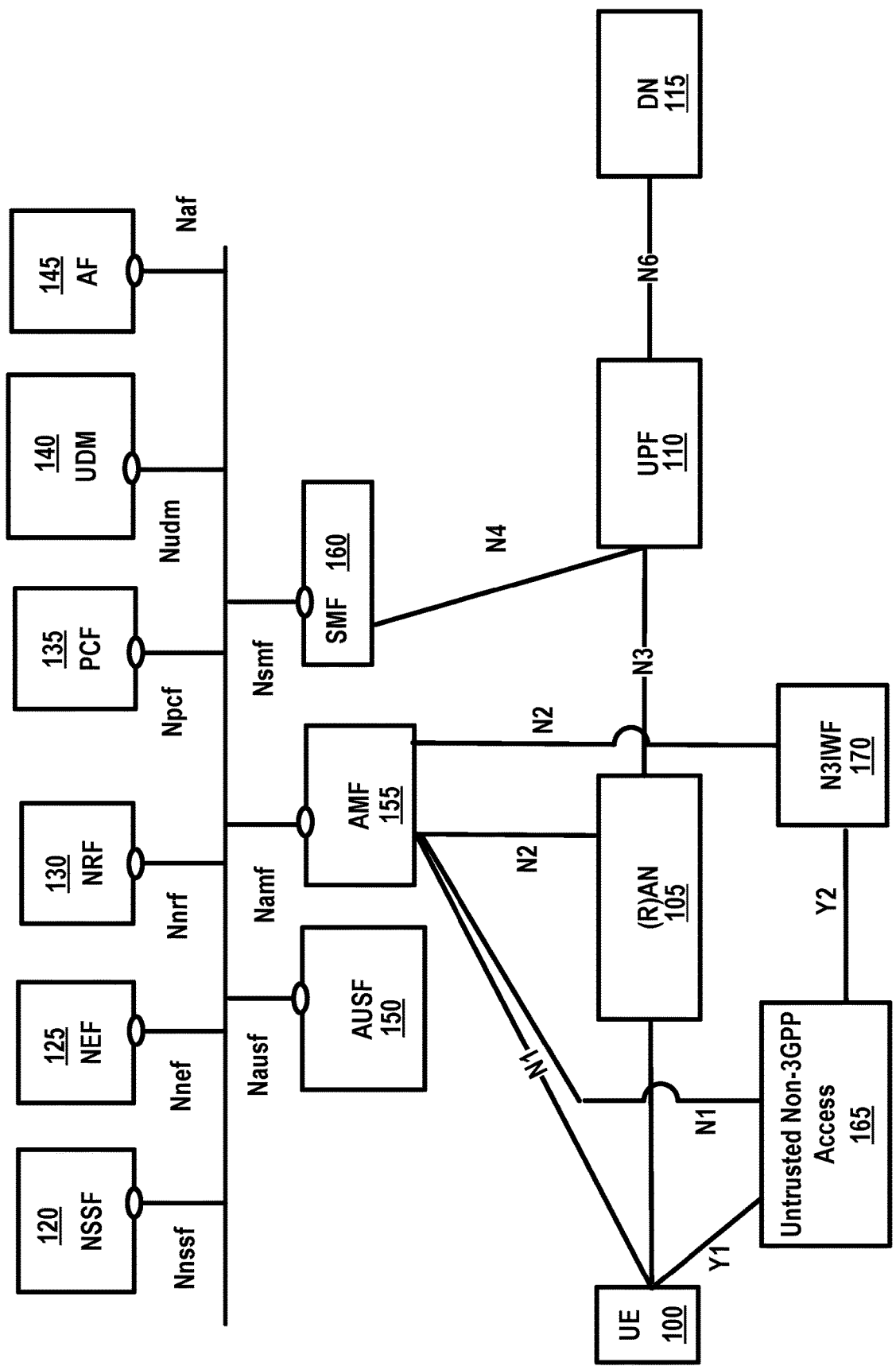
FIG. 1 is a diagram of an example 5G system architecture as per an aspect of an embodiment of the present disclosure.
Figure 2:
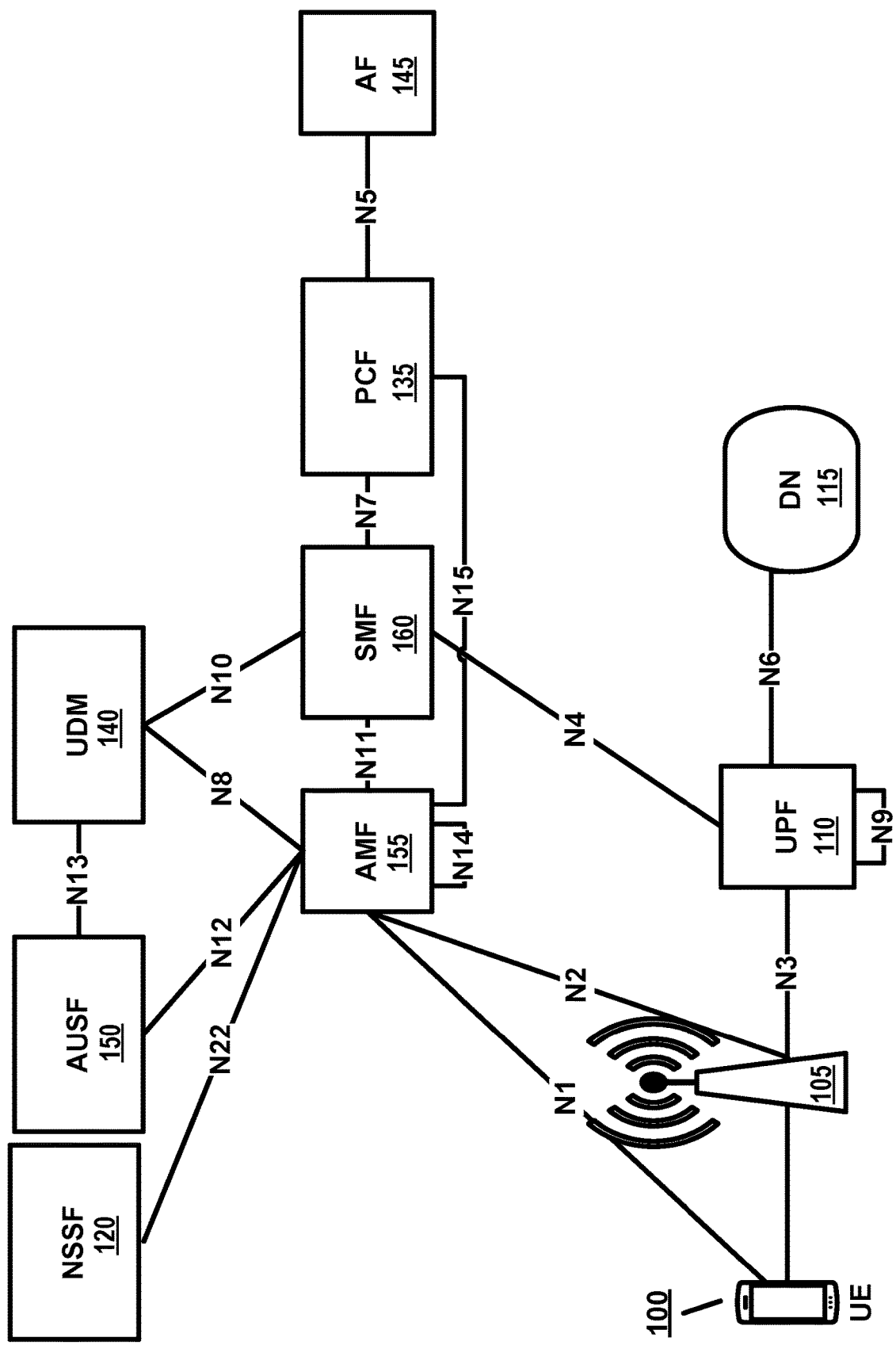
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMF Access and Mobility Management Function
AN Access Network
ARP Allocation and Retention Priority
CDR Charging Data Record
CCNF Common Control Network Functions
CN Core Network
CP Control Plane
DL Downlink
DN Data Network
DN-AAA Data Network Authentication Authorization and Accounting
DNN Data Network Name
ESP Encapsulating Security Payload
gNB NR NodeB
IETF Internet Engineering Task Force
IP Internet Protocol
L2 Layer 2 (data link layer)
L3 Layer 3 (network layer)
LADN Local Area Data Network
LI Lawful Intercept
MICO Mobile Initiated Connection Only
MME Mobility Management Entity
N3IWF Non-3GPP InterWorking Function
NAI Network Access Identifier
NAS Non Access Stratum
NEF Network Exposure Function
NF Network Function
NG-RAN NR Radio Access Network
NR New Radio
NRF Network Repository Function NSI Network Slice Instance
NSSAI Network Slice Selection Assistance Information
NSSF Network Slice Selection Function
OCS Online Charging System
OFCS Offline Charging System
PCC Policy and Charging Control
PCF Policy Control Function
PDU Packet Data Unit
PDCP Packet Data Convergence Protocol
RB Radio Bearer
RFC Request For Comments
RLC Radio Link Control
ROHC RObust Header Compression
RRC Radio Resource Control
PEI Permanent Equipment Identifier
PLMN Public Land Mobile Network
RAN Radio Access Network
QFI QoS Flow Identity
RM Registration Management
SBA Service Based Architecture
SCM Security Context Management
SDAP Service Data Adaptation Protocol
SDU Service Data Unit
SEA Security Anchor Function
SMF Session Management Function
SMSF SMS Function
SN Sequence Number
S-NSSAI Single Network Slice Selection Assistance information
SRB Signaling Radio Bearer carrying control plane data
SUPI Subscriber Permanent Identifier
TA Tracking Area
TAI Tracking Area Identity
TCP Transmission Control Protocol
UDM Unified Data Management
UDP User Datagram Protocol
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise a NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces are employed for communication among the functional elements and/or network elements.

Figure 3:
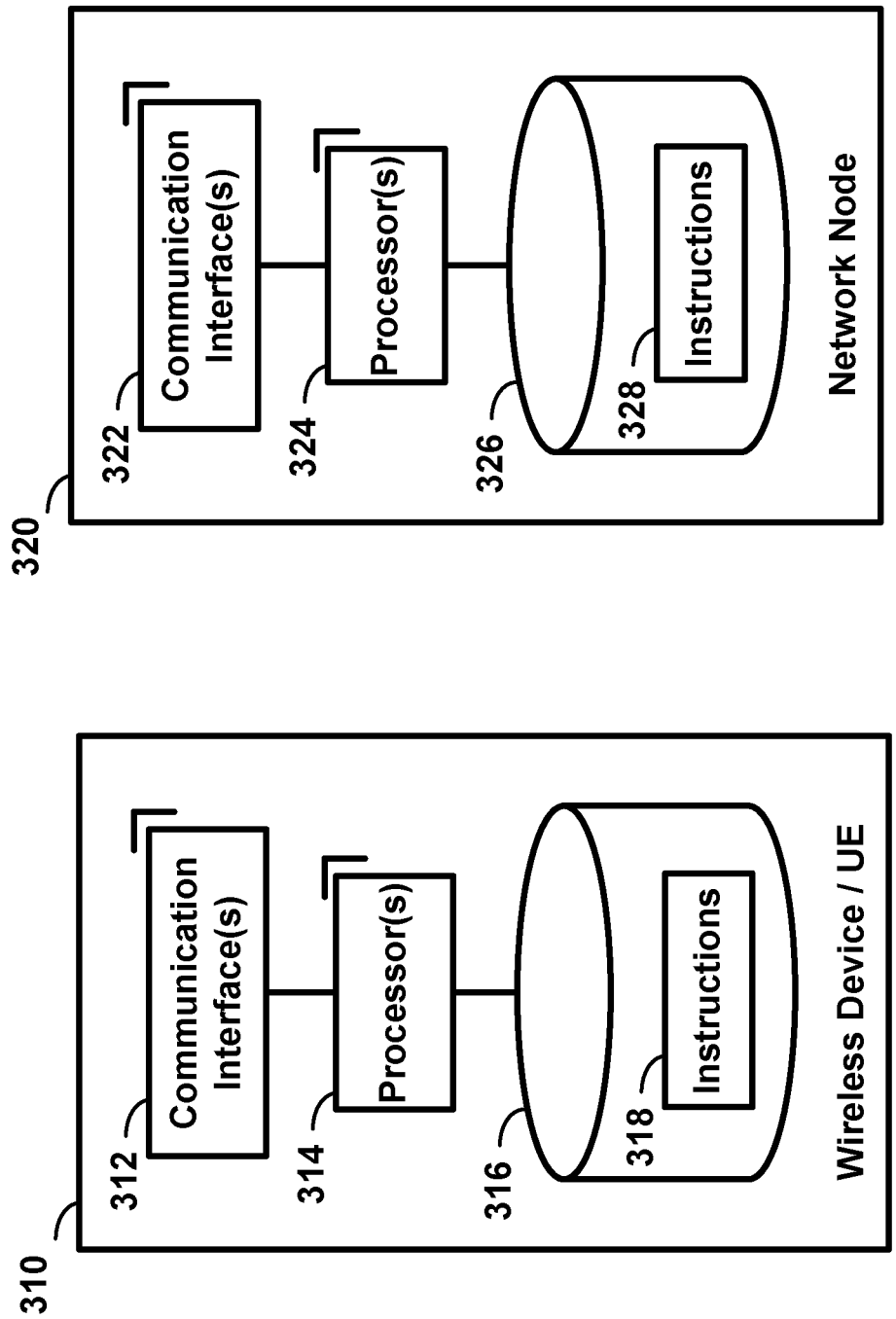
FIG. 3 is a system diagram of an example wireless device and a network node in a 5G system as per an aspect of an embodiment of the present disclosure.
Figure 4:
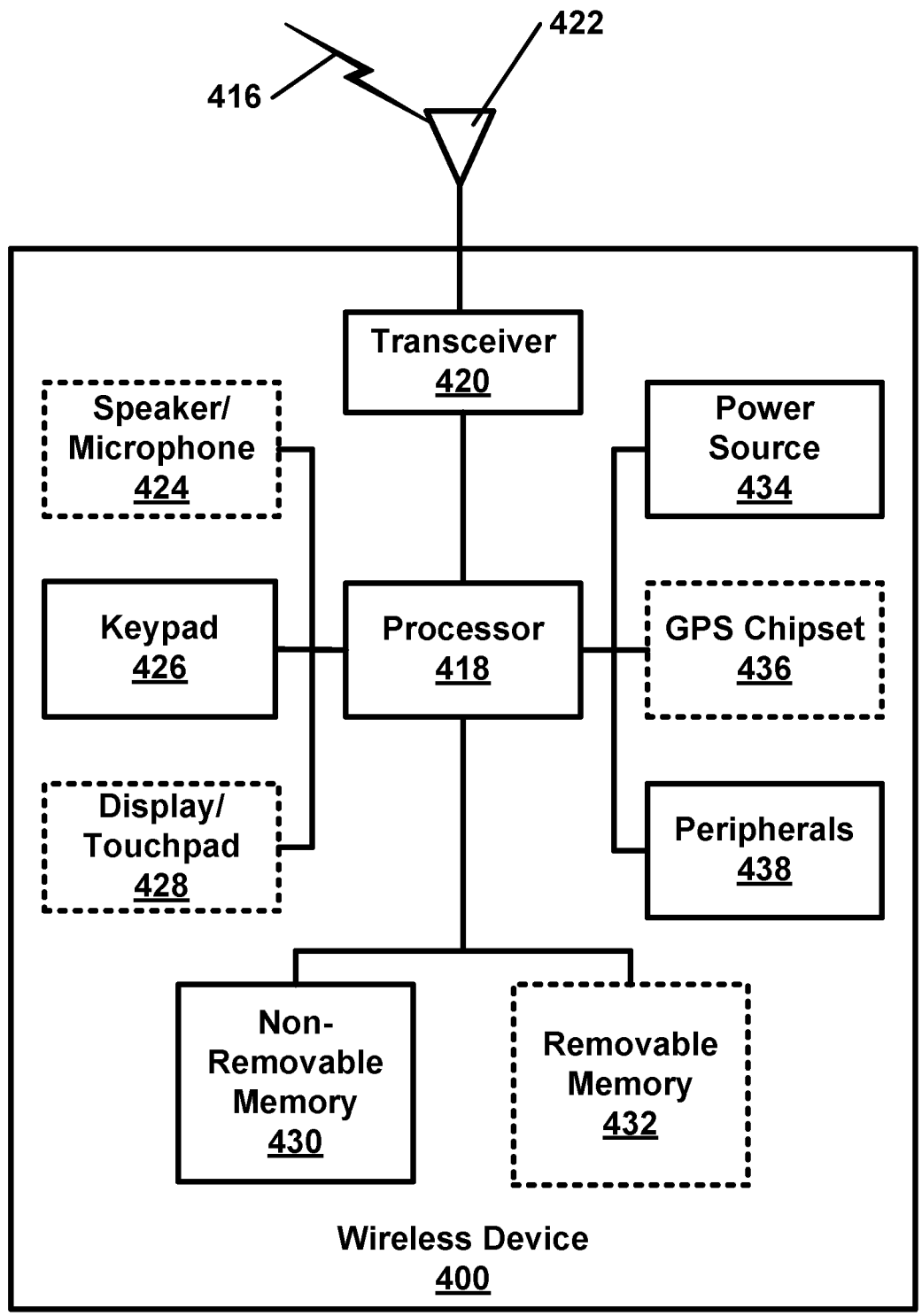
FIG. 4 is a system diagram of an example wireless device as per an aspect of an embodiment of the present disclosure.

A network function may be a processing function in a network, which has a functional behavior and interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

Access and mobility management function, AMF 155, may include the following functionalities (some of the AMF functionalities may be supported in a single instance of an AMF 155): termination of RAN CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys.

The AMF 100 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP and non-3GPP accesses 105, 165 simultaneously, support of a coordinated RM context valid over 3GPP and non 3GPP accesses 105, 165, support of CM management contexts for the UE 100 for connectivity over non-3GPP access. Some of functionalities described above may be supported in an instance of a network slice.

In an example, an AMF 155 region may comprise of one or multiple AMF 100 sets. AMF 155 set comprises of some AMFs 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that has been provisioned in a UE 100. DN 115 access identifier (DNAI), for a DNN, may be an identifier of a user plane access to a DN 115. Initial registration may be related to a UE 100 registration in RM-DEREGISTERED 500, 520 state. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

The session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115. One or more of functionalities described above may be required to be supported in an instance of a network slice.

The user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering and downlink data notification triggering. One or more of functionalities described above may be supported in an instance of a network slice.

The UE 100 IP address management may include allocation and release of the UE 100 IP address as well as renewal of the allocated IP address, where applicable. The UE 100 sets the requested PDU type during the PDU session establishment procedure based on its IP stack capabilities and configuration. In an example, the SMF 160 may select PDU type of a PDU session as follows: If the SMF 160 receives a request with PDU type set to IP, the SMF 160 may select either PDU type IPv4 or IPv6 based on DNN configuration and operator policies. A SMF 160 may provide a cause value to the UE 100 to indicate whether the other IP version is supported on the DNN. If the other IP version is supported, UE 100 may request another PDU Session to the same DNN for the other IP version. If the SMF 160 receives a request for PDU type IPv4 or IPv6 and the requested IP version is supported by the DNN the SMF selects the requested PDU type.

In an example embodiment, the 5GC elements and UE 100 support the following mechanisms: during PDU session establishment procedure, the SMF 160 may send the IP address to the UE 100 via SM NAS signaling. The IPv4 address allocation and/or IPv4 parameter configuration via DHCPv4 may be employed once PDU session is established. IPv6 prefix allocation may be supported via IPv6 stateless autoconfiguration, if IPv6 is supported. IPv6 parameter configuration via stateless DHCPv6 may be supported.

The 5GC may support the allocation of a static IPv4 address and/or a static IPv6 prefix based on subscription information in the UDM 140 or based on the configuration on a per-subscriber, per-DNN basis.

User plane function(s) (UPF(s) 110) may handle the user plane path of PDU sessions. A UPF 110 that provides the interface to a data network supports the functionality of a PDU session anchor.

The policy control function, PCF 135, may support unified policy framework to govern network behavior, provide policy rules to control plane function(s) to enforce them, implement a front end to access subscription information relevant for policy decisions in a user data repository (UDR).

The network exposure function, NEF 125, may provide a means to securely expose the services and capabilities provided by the 3GPP network functions, translate between information exchanged with the AF 145 and information exchanged with the internal network functions, receive information from other network functions.

The NF repository function, NRF 130 may support service discovery function that receives NF discovery request from NF instance, provide the information of the discovered NF instances (be discovered) to the NF instance, and maintain the information of available NF instances and their supported services.

The unified data management, UDM 140, may comprise of the application front end (FE) that includes the UDM-FE that is in charge of processing credentials, location management, subscription management and the PCF 135 in charge of policy control; and the user data repository, UDR, that stores data required for functionalities provided by UDM-FE, plus policy profiles required by the PCF 135.

The NSSF may support selecting the set of network slice instances serving the UE 100, determining the Allowed NSSAI, determining the AMF 155 set to be employed to serve the UE 100, and/or, based on configuration, determining a list of candidate AMF(s) 155, possibly by querying the NRF 130.

The data stored in the UDR include at least user subscription data, including at least subscription identifiers, security credentials, access and mobility related subscription data and/or session related subscription data and/or policy data.

The AUSF 150 may support authentication server function (AUSF). The functionality of N3IWF 170 in case of untrusted non-3GPP access 165 may include at least one or more of the following: support of IPsec tunnel establishment with the UE; The N3IWF 170 may terminate the IKEv2/IPsec protocols with the UE 100 over NWu and may relay over N2 the information needed to authenticate the UE 100 and authorize its access to the 5G core network; Termination of N2 and N3 interfaces to 5G Core Network for Control-Plane and user-plane respectively; Relaying uplink and downlink control-plane NAS (N1) signaling between the UE 100 and AMF 155; Handling of N2 signaling from SMF 160 (relayed by AMF 155) related to PDU sessions and QoS; Establishment of IPsec Security Association (IPsec SA) to support PDU session traffic; Relaying uplink and downlink user-plane packets between the UE 100 and UPF 110; Enforcing QoS corresponding to N3 packet marking, considering QoS requirements associated to such marking received over N2; N3 user-plane packet marking in the uplink; and/or local mobility anchor within untrusted non-3GPP access networks 165 using MOBIKE; Supporting AMF 155 selection.

The application function, AF 145, may interact with the 3GPP core network to provide services. Based on operator deployment, application functions may be trusted by the operator to interact directly with relevant network functions. Application functions not allowed by the operator to access directly the network functions may use the external exposure framework (via the NEF 125) to interact with relevant network functions.

The control plane interface between the (R)AN 105 and the 5G core may support connection of multiple different kinds of AN(s) (e.g. 3GPP RAN 105, N3IWF 170 for Untrusted access 165) to the 5GC via a unique control plane protocol. A single N2 AP protocol may be employed for both the 3GPP access 105 and non-3GPP access 165; and decoupling between AMF 155 and other functions such as SMF 160 that may need to control the services supported by AN(s) (e.g. control of the UP resources in the AN 105 for a PDU session).

The 5GC may be able to provide policy information from the PCF 135 to the UE 100. Such policy information may include but not limited to the following: access network discovery & selection policy, UE 100 route selection policy (URSP) that groups to or more of SSC mode selection policy (SSCMSP), network slice selection policy (NSSP), DNN selection policy, and non-seamless offload policy.

The 5G core network may support the connectivity of a UE 100 via non-3GPP access networks 165. As shown in example FIG. 5, the registration management, RM may be employed to register or de-register a UE/user 100 with the network, and establish the user context in the network.

Connection management may be employed to establish and release the signaling connection between the UE 100 and the AMF 155.

A UE 100 may need to register with the network to receive services that require registration. Once registered and if applicable the UE 100 may update its registration with the network periodically in order to remain reachable (periodic registration update); or upon mobility (mobility registration update); or to update its capabilities or re-negotiate protocol parameters.

Figure 8:
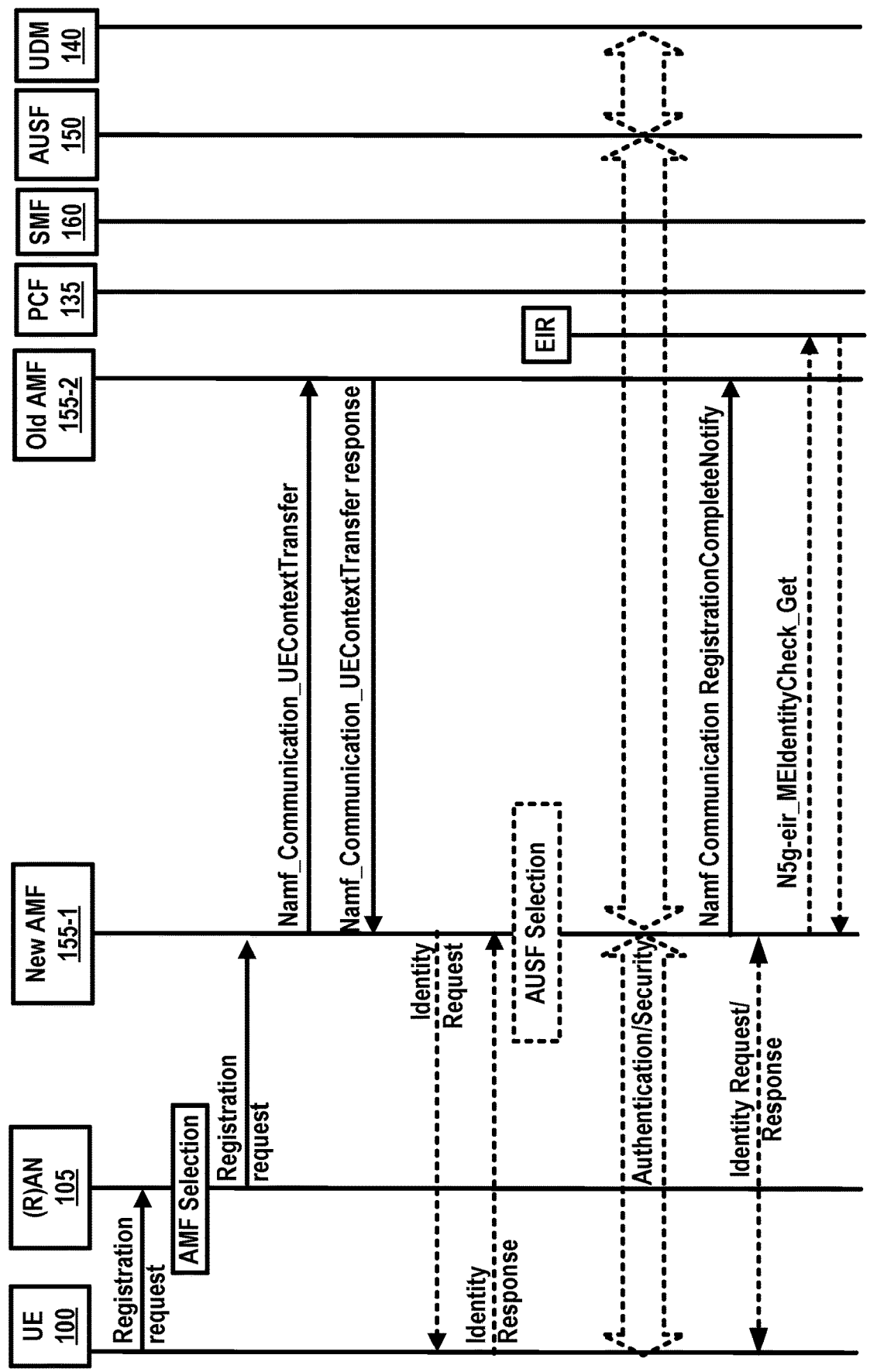
FIG. 8 and FIG. 9 are example call flows for UE registration procedure as per an aspect of an embodiment of the present disclosure.
Figure 9:
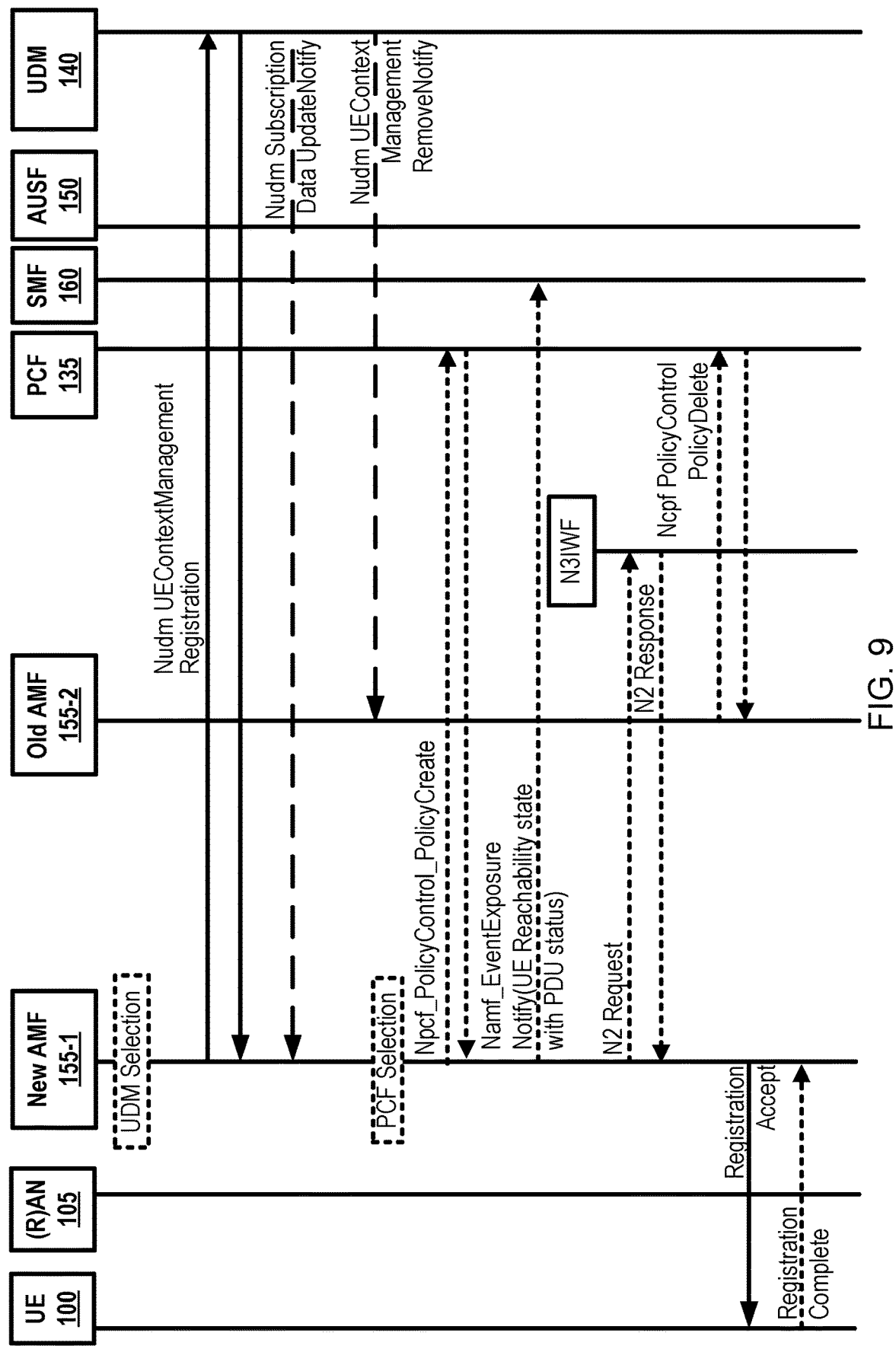

The initial registration procedure as depicted in example FIG. 8 and FIG. 9 may involve execution of network access control functions (e.g. user authentication and access authorization based on subscription profiles in UDM 140). As result of the registration procedure, the identity of the serving AMF 155 may be registered in UDM 140.

The registration management, RM procedures may be applicable over both 3GPP access 105 and non 3GPP access 165.

Figure 5:
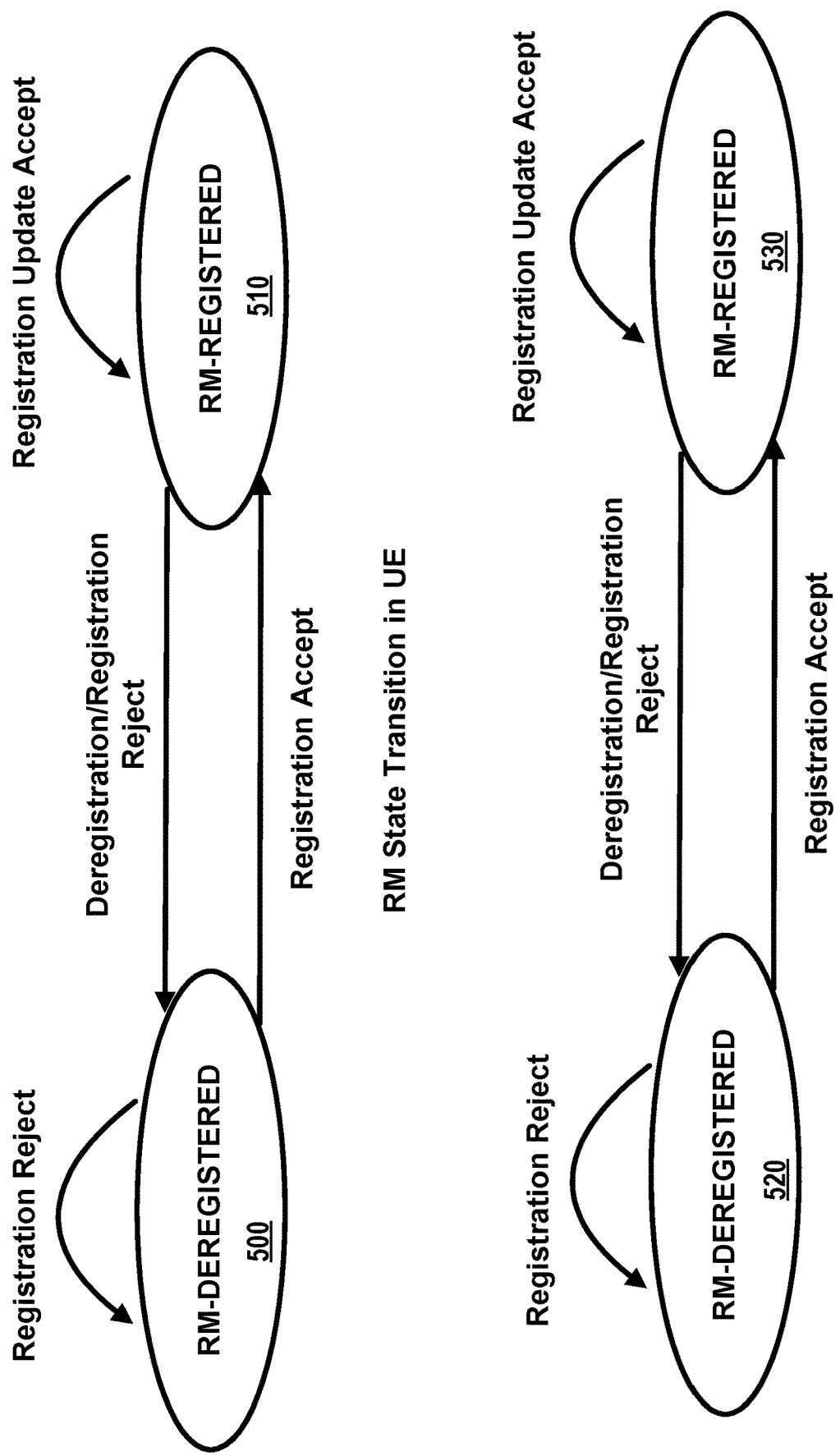
FIG. 5 depicts two registration management state models in UE 100 and AMF 155 as per an aspect of an embodiment of the present disclosure.

An example FIG. 5 depicts the RM states of a UE 100 as observed by the UE 100 and AMF 155. In an example embodiment, two RM states may be employed in a UE 100 and the AMF 155 that reflect the registration status of the UE 100 in the selected PLMN: RM-DEREGISTERED 500, and RM-REGISTERED 510. In the RM DEREGISTERED state 500, the UE 100 may not be registered with the network. The UE 100 context in AMF 155 may not hold valid location or routing information for the UE 100 so the UE 100 is not reachable by the AMF 155. Some UE 100 context may still be stored in the UE 100 and the AMF 155. In the RM REGISTERED state 510, the UE 100 may be registered with the network. In the RM-REGISTERED 510 state, the UE 100 may receive services that require registration with the network.

In an example embodiment, two RM states may be employed in AMF 155 for a UE 100 that reflect the registration status of the UE 100 in the selected PLMN: RM-DEREGISTERED 520, and RM-REGISTERED 530.

Figure 6:
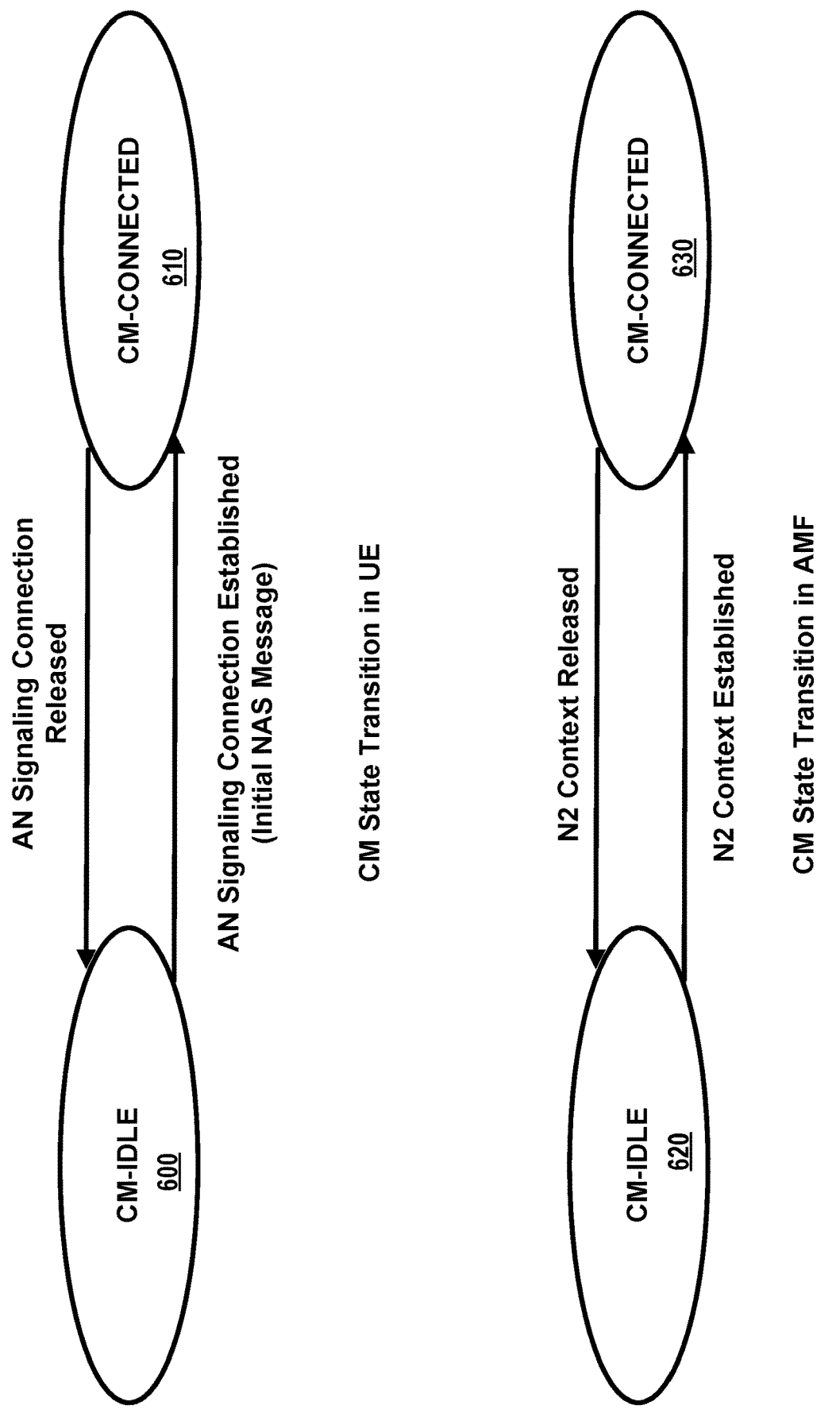
FIG. 6 depicts two connection management state models in UE 100 and AMF 155 as per an aspect of an embodiment of the present disclosure.

As shown in example FIG. 6, connection management, CM, may comprise the functions of establishing and releasing a signaling connection between a UE 100 and the AMF 155 over N1. This signaling connection may be employed to enable NAS signaling exchange between the UE 100 and a core network. It comprises both the AN signaling connection between the UE 100 and the (R)AN 105 (e.g. RRC connection over 3GPP access) and the N2 connection for this UE 100 between the AN and the AMF 155.

As depicted in example FIG. 6, two CM states may be employed for the NAS signaling connectivity of the UE 100 with the AMF 155, CM-IDLE 600, 620 and CM-CONNECTED 610, 630. A UE 100 in CM-IDLE 600 state is in RM-REGISTERED 510 state and has no NAS signaling connection established with the AMF 155 over N1. The UE 100 may perform cell selection, cell reselection and PLMN selection. A UE 100 in CM-CONNECTED 610 state has a NAS signaling connection with the AMF 155 over N1.

In an example embodiment two CM states may be employed for a UE 100 at the AMF 155, CM-IDLE 620 and CM-CONNECTED 630.

RRC inactive state may apply to NG-RAN (e.g. it applies to NR and E-UTRA connected to 5G CN). The AMF 155, based on network configuration, may provide assistance information to the NG RAN 105, to assist the NG RAN's 105 decision whether the UE 100 is sent to RRC inactive state. When a UE 100 is CM-CONNECTED 610 with RRC inactive state, the UE 100 may resume the RRC connection due to uplink data pending; Mobile initiated signaling procedure; As a response to RAN 105 paging; Notifying the network that it has left the RAN 105 notification area.

NAS signaling connection management may include the functions of establishing and releasing a NAS signaling connection. NAS signaling connection establishment function may be provided by the UE 100 and the AMF 155 to establish a NAS signaling connection for a UE 100 in CM-IDLE 600 state. The procedure of releasing a NAS signaling connection may be initiated by the 5G (R)AN 105 node or the AMF 155.

Reachability management of UE 100 may detect whether a UE 100 is reachable and providing UE 100 location (e.g. access node) for the network to reach the UE 100. This may be done by paging UE 100 and UE 100 location tracking. The UE 100 location tracking may include both UE 100 registration area tracking and UE 100 reachability tracking. Such functionalities may be either located at 5GC (in case of CM-IDLE 620 state) or NG-RAN 105 (in case of CM-CONNECTED 630 state). The UE 100 and the AMF 155 may negotiate UE 100 reachability characteristics in CM-IDLE 600, 620 state during registration and registration update procedures.

Two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between a UE 100 and a data network identified by a DNN. The PDU connectivity service may be supported via PDU sessions that are established upon request from the UE 100.

A PDU session may support one or more PDU session types. PDU sessions may be established (e.g. upon UE 100 request), modified (e.g. upon UE 100 and 5GC request) and released (e.g. upon UE 100 and 5GC request) using NAS SM signaling exchanged over N1 between the UE 100 and the SMF 160. Upon request from an application server, the 5GC may be able to trigger a specific application in the UE 100. When receiving that trigger message, the UE 100 may pass it to the identified application in the UE 100. The identified application in the UE 100 may establish a PDU session to a specific DNN.

Figure 7:
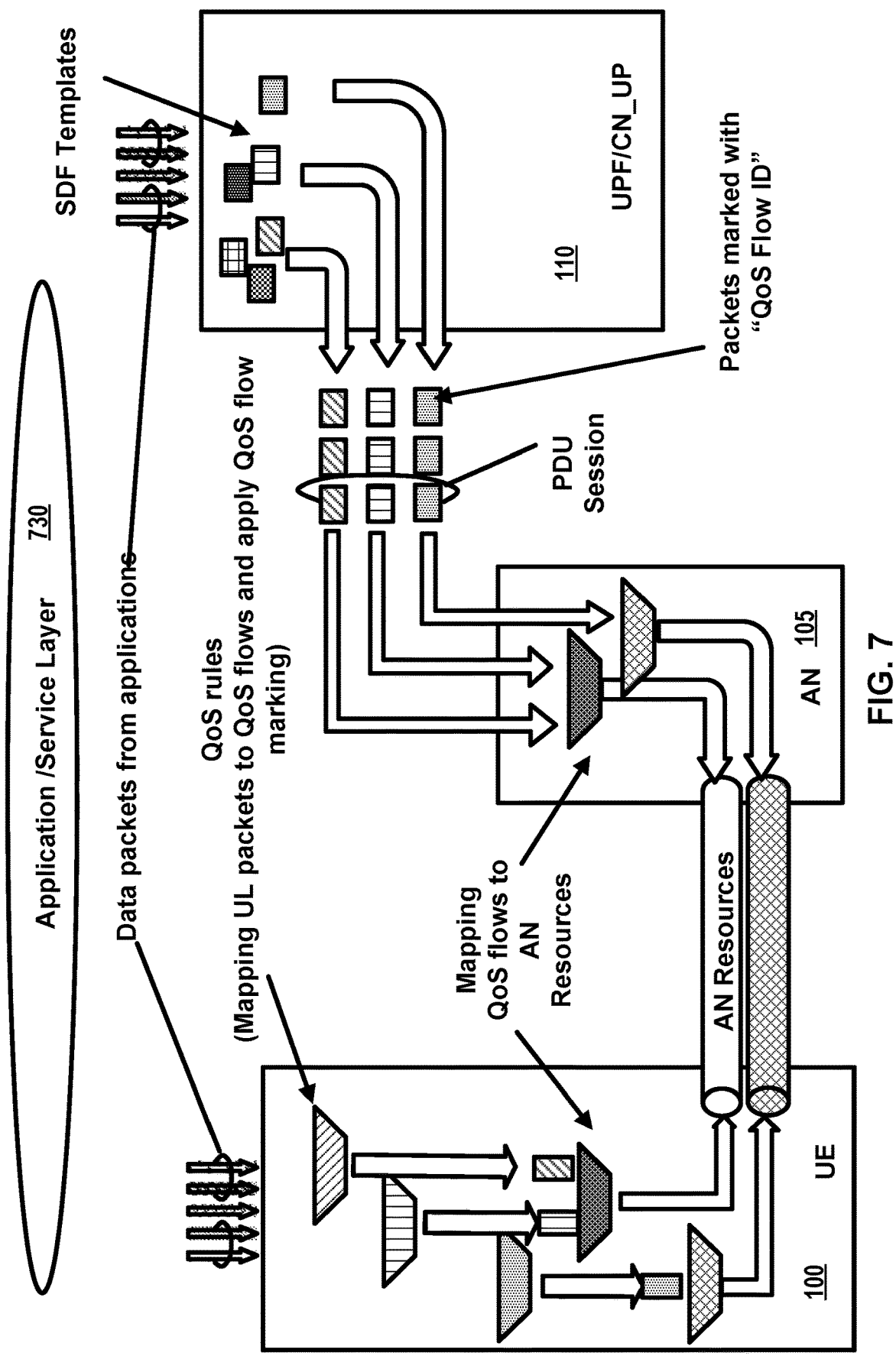
FIG. 7 is diagram for classification and marking traffic as per an aspect of an embodiment of the present disclosure.

The 5G QoS model may support a QoS flow based framework as shown in example FIG. 7. The 5G QoS model may support both QoS flows that require a guaranteed flow bit rate and QoS flows that may not require a guaranteed flow bit rate. The 5G QoS model may support reflective QoS. The QoS model may comprise flow mapping or packet marking at the UPF (CN_UP) 110, AN 105 and/or UE 100. Packets may arrive from and/or destined to the application/service layer 730 of UE 100, UPF (CN_UP) 110, and/or the AF 145.

QoS flow may be a granularity of QoS differentiation in a PDU session. A QoS Flow ID, QFI, may be employed to identify a QoS flow in the 5G system. User plane traffic with the same QFI within a PDU session may receive the same traffic forwarding treatment. The QFI may be carried in an encapsulation header on N3 (and N9) e.g. without any changes to the end-to-end packet header. It may be applied to PDUs with different types of payload. The QFI may be unique within a PDU session.

The QoS parameters of a QoS flow may be provided to the (R)AN as a QoS profile over N2 at PDU session or at QoS flow establishment and when NG-RAN is used at every time the user plane is activated. A default QoS rule may be required for every PDU session. The SMF 160 may allocate the QFI for a QoS flow and may derive its QoS parameters from the information provided by the PCF. When applicable, the SMF 160 may provide the QFI together with the QoS profile containing the QoS parameters of a QoS flow to the (R)AN 105.

5G QoS flow may be a granularity for QoS forwarding treatment in a 5G system. Traffic mapped to the same 5G QoS flow may receive the same forwarding treatment (e.g. scheduling policy, queue management policy, rate shaping policy, RLC configuration, and/or the like). Providing different QoS forwarding treatment may require separate 5G QoS flow.

A 5G QoS indicator may be a scalar that is employed as a reference to a specific QoS forwarding behavior (e.g. packet loss rate, packet delay budget) to be provided to a 5G QoS flow. This may be implemented in the access network by the 5QI referencing node specific parameters that control the QoS forwarding treatment (e.g. scheduling weights, admission thresholds, queue management thresholds, link layer protocol configuration, and/or the like.).

5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. This may be based on the UE's 100 subscription data, UE 100 location, the information from application function AF 145, policy or other related traffic rules. The 5G core network may expose network information and capabilities to an edge computing application function. The functionality support for edge computing may include local routing where the 5G core network may select UPF 110 to route the user traffic to the local data network, traffic steering where the 5G core network selects the traffic to be routed to the applications in the local data network, session and service continuity to enable UE 100 and application mobility, user plane selection and reselection, e.g. based on input from application function, network capability exposure where 5G core network and application function may provide information to each other via NEF, QoS and charging where PCF may provide rules for QoS control and charging for the traffic routed to the local data network, support of local area data network where 5G core network may provide support to connect to the LADN in a certain area where the applications are deployed.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

PDU connectivity service may provide exchange of PDUs between a UE 100 and a data network. PDU session may be an association between a UE 100 and a data network, DN, that provides a PDU connectivity service. The type of association may be IP, or Ethernet or unstructured.

Establishment of user plane connectivity to a data network via a network slice instance(s) comprises of at least two steps. Performing a RM procedure to select an AMF 155 that supports the required network slices, and establishing one or more PDU session(s) to the required data network via the network slice instance(s).

The set of network slices for a UE 100 may be changed at any time while the UE 100 is registered with a network, and may be initiated by the network, or the UE 100.

A periodic registration update may be UE 100 re-registration at expiry of a periodic registration timer. A requested NSSAI is a NSSAI that the UE 100 may provide to the network. A service based interface may represent how a set of services is provided/exposed by a given NF.

A service continuity may be an uninterrupted user experience of a service, including the cases where the IP address and/or anchoring point change. A session continuity may refer to continuity of a PDU session. For PDU session of IP type session continuity may imply that the IP address is preserved for the lifetime of the PDU session. An uplink classifier may be a UPF functionality that aims at diverting uplink traffic, based on filter rules provided by SMF, towards data network.

The 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

A 5G system may reduce dependencies between the access network (AN) and the core network (CN). The architecture may comprise a converged access-agnostic core network with a common AN-CN interface which integrates different 3GPP and non-3GPP access types.

A 5G system furthermore may support a unified authentication framework, stateless NFs, where the compute resource is decoupled from the storage resource, capability exposure, and concurrent access to local and centralized services. To support low latency services and access to local data networks, UP functions may be deployed close to the access network.

A 5G system may support roaming with both home routed traffic as well as local breakout traffic in the visited PLMN. An example 5G architecture may be service-based and the interaction between network functions may be represented in two ways. (1) FIG. 1 is an example service-based representation, where network functions within the control plane, may enable other authorized network functions to access their services. This representation may include point-to-point reference points where necessary. (2) FIG. 2 is an example reference point representation, showing the interaction between the NF services in the network functions described by point-to-point reference point (e.g. N11) between any two network functions.

Figure 10:
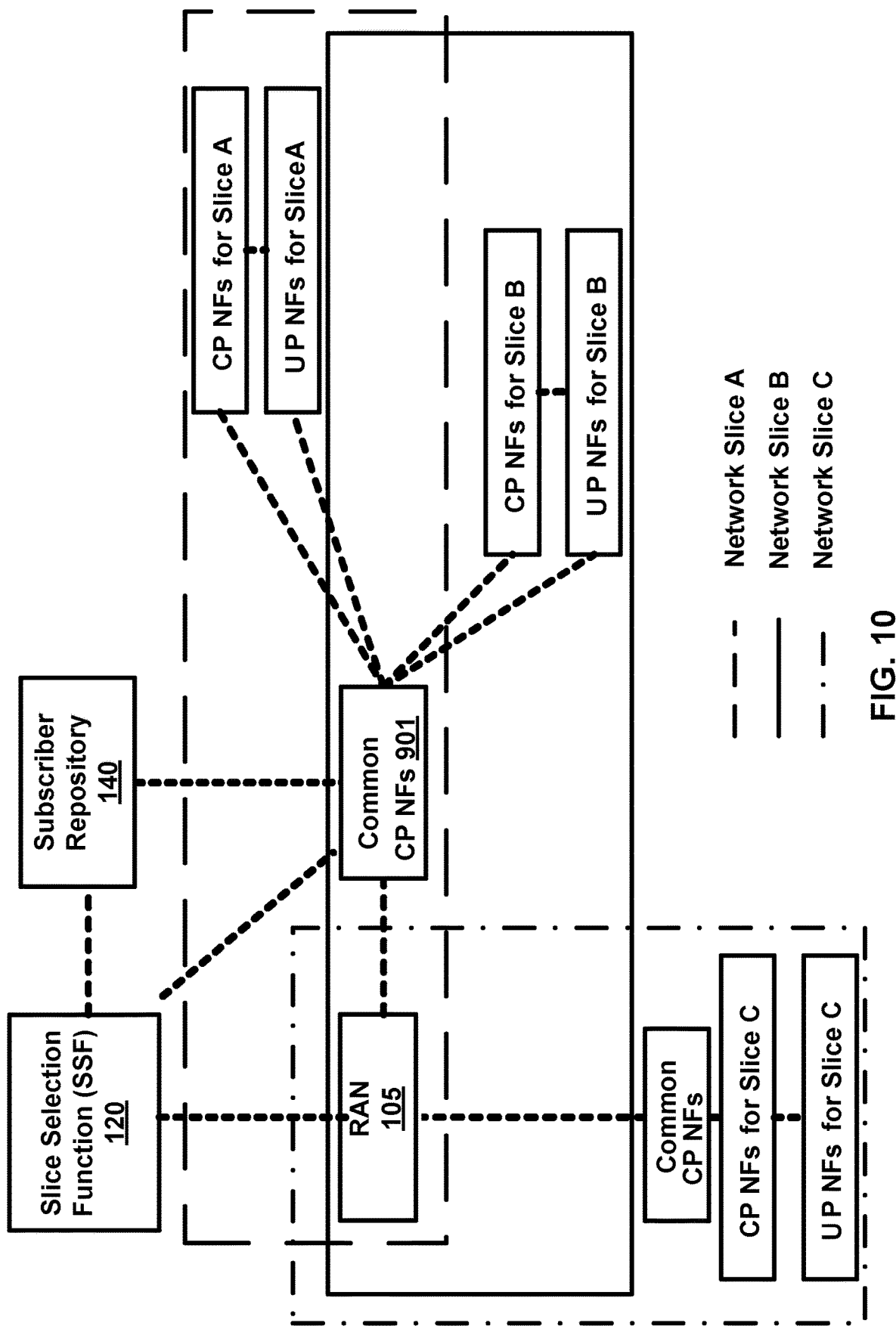
FIG. 10 is an example diagram of control plane interfaces for network slicing as per an aspect of an embodiment of the present disclosure.

FIG. 10 is an example diagram of control plane interfaces for network slicing as per an aspect of an embodiment of the present invention. FIG. 10 shows control plane network functions (CP NFs) and user plane network functions (UP NFs) for example slice A, slice B, and slice C.

One or more RAN or core network nodes may use a slice routing and selection function (SSF) 120 to link radio access bearer(s) of a UE with the corresponding core network instance(s). The Subscriber Repository 140 may contain subscriber profiles which may be used for authorization. The Subscriber Repository 140 may also include user identities and corresponding long-term credentials for authentication. The RAN 105 may appear as one RAT+PLMN to a UE and an association with network instance may be performed by network internally. In an example implementation, the network slices may not be visible to the UE. Common CP NFs 901 may be the CP entry function, which may include the mobility management function, authentication function, and NAS proxy function. The common CP may be shared parts among different slices. When different types of network slice do the sharing, the required common CP function may be different.

Figure 11:
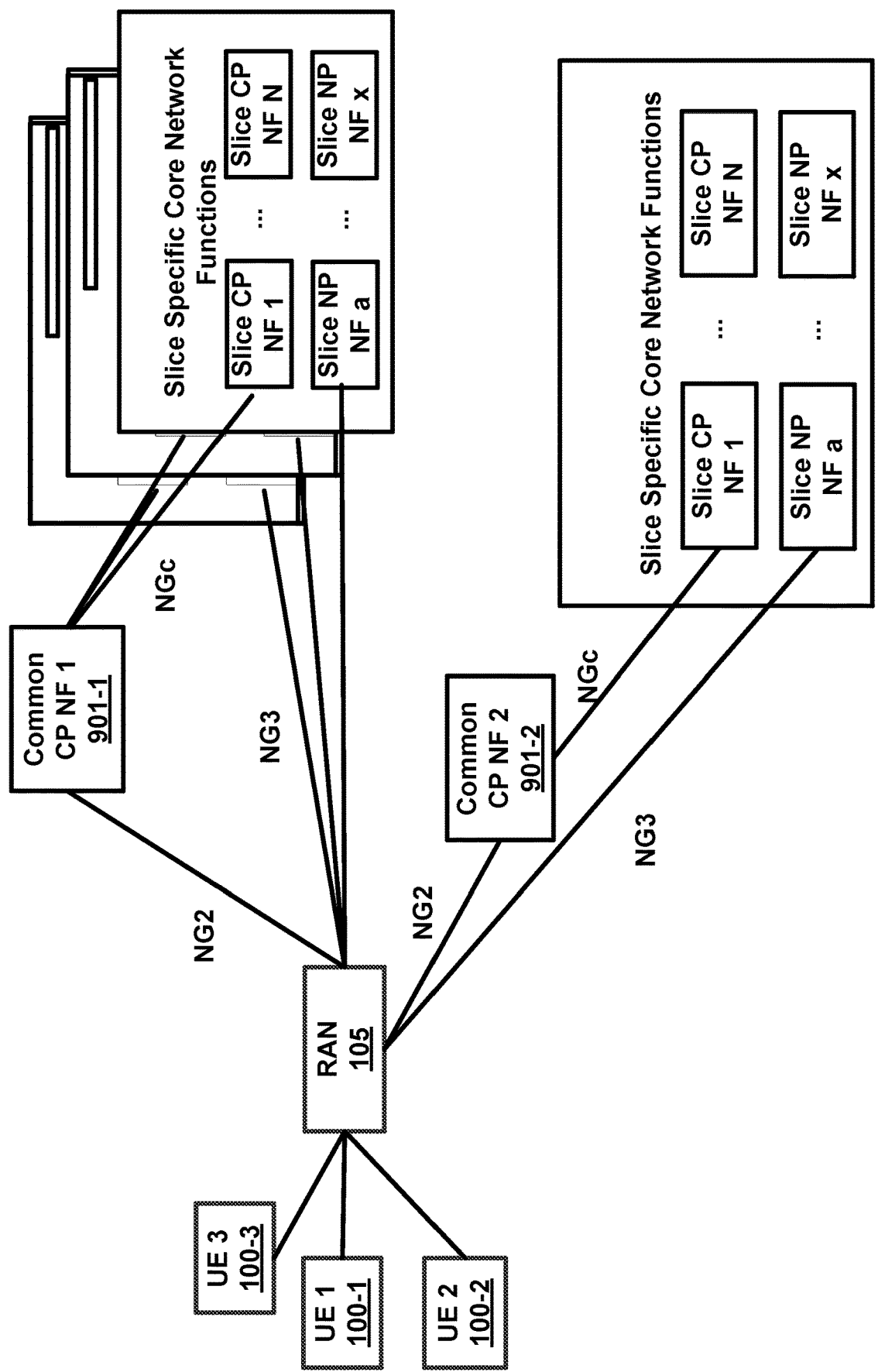
FIG. 11 is an example diagram depicting UEs assigned to core part of NSI as per an aspect of an embodiment of the present disclosure.

FIG. 11 is an example diagram depicting UE1 100-1, UE2 100-2, and UE3 100-3 that are assigned to a core part of network slice instances (NSI) as per an aspect of an embodiment of the present invention. UE1 100-1, UE2 100-2 and UE3 100-3 are connected to specific core network functions via RAN 105. The core network part of the network slice may share some network functions with other core network part of network slices which serve the same UE, including the NG1 and NG2 terminations, in the common control network functions (CCNF). As an example, in the FIG. 11, UE1 100-1 and UE3 100-3 may be assigned to Common CP NF 1 901-1, and may have 3 slices accessing multiple core network slice instances (NSIs) and therefore multiple slice-specific core network functions. UE2 100-2 may be associated with 1 NSI and is assigned to different Common CP NF 2 901-2 after the UEs attach to has occurred.

Figure 12:
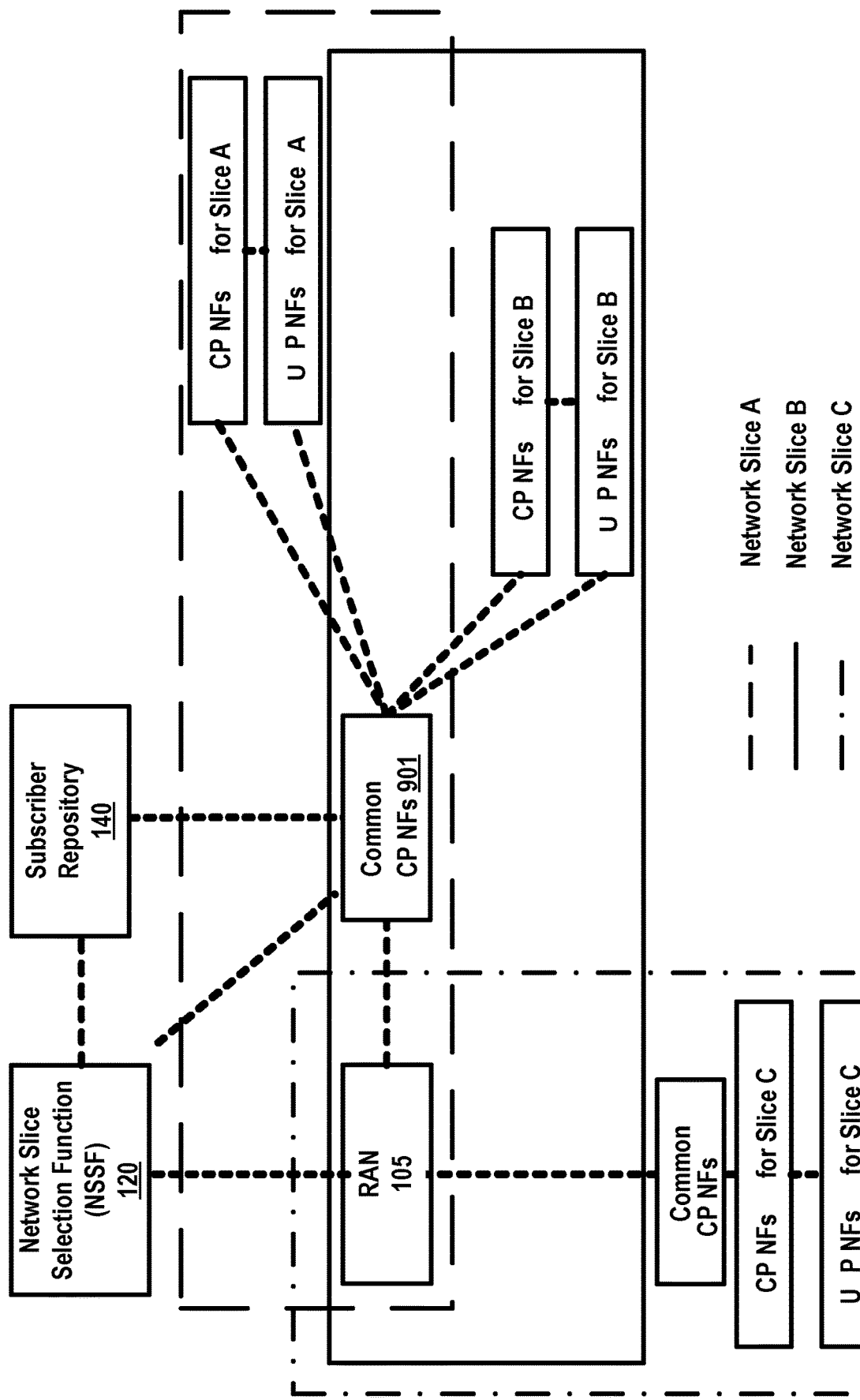
FIG. 12 is an example diagram depicting network slice architecture with two groups-common CP NFs and dedicated CP NFs as per an aspect of an embodiment of the present disclosure.

FIG. 12 is an example diagram depicting network slice architecture with two groups-common CP NFs and dedicated CP NFs as per an aspect of an embodiment of the present invention. In an example, the core Network Instances may be set up to enable a UE to simultaneously obtain services from multiple network slices of one network operator. A single set of C-Plane Functions that are in common among core network instances may be shared across multiple core network instances. In an example, U-plane functions and other C-Plane functions that are not in common may reside in their respective core network instances, and may be not shared with other core network instances.

In an example embodiment, a slice instance ID may be an identifier of a network slice instance. A slice instance ID may be used as an indicator by the network to select the corresponding slice for a UE. A CP-NF ID may be an identifier of a control plane network function instance. In an example, the NSSF (Network Slice Selection Function) 120 may be common to network slices in the PLMN and may realize the slice selection function for both groups.

The NSSF 120 may store the mapping information between slice instance ID and NF ID (or NF address). The NSSF 120 may have connection with the subscriber repository 140 to get the UE's subscribed slice instance IDs corresponding to current PLMN. NSSF 120 may obtain network slice selection policy from policy function. CP-NF ID or address may be determined by the NSSF 120 based on slice instance ID, UE's subscribed information, and/or network slice selection policy. NSSF 120 may respond the specific CP-NF ID/address corresponding to the slice instance ID to the RAN 105. The NSSF 120 may be located in the core network, which may be useful for the interaction and mapping update between the NSSF 120 and subscriber repository 140, and this may make the management of the mapping between Slice Instance ID and NF ID/address in a centralized way. The RAN 105 may act as a routing function to link the UE with the appropriate CN part of network slice. The RAN 105 may store the mapping between the Slice Instance ID and NF ID. The Common CP NFs 901 may be used for multiple slices with UE simultaneously connected. A UE may access multiple network slices at the same time, the Common CP NFs 901 may have common set of NFs which may be flexibly expanded with additional NFs per slice requirement. In an example, when a UE is slice-enabled, there may be one or more cases for the attach procedure as described here. One case involves a UE attaching without a Slice Instance ID. The UE may or may not take some assistant parameters (e.g. service type). The RAN 105 may forward the attach request to NSSF 120. NSSF 120, may check with subscription data and network slice selection policy, response with a predefined/default Slice Instance ID to the UE. One case involves UE attaching with a Slice Instance ID. In an example, the RAN 105 may not know the corresponding slice. The RAN 105 may forward the UE request signaling to NSSF 120 and NSSF 120 may respond with specific CP-NF ID/address corresponding to the Slice Instance ID. The RAN 105 may route the attach request to the specific CP-NF. One case involves UE attaching with a Slice Instance ID. The RAN 105 may have the related mapping between the Slice Instance ID carried by UE and CP-NF ID. The attach request may be routed to the specific CP-NF in the core network.

Figure 13:
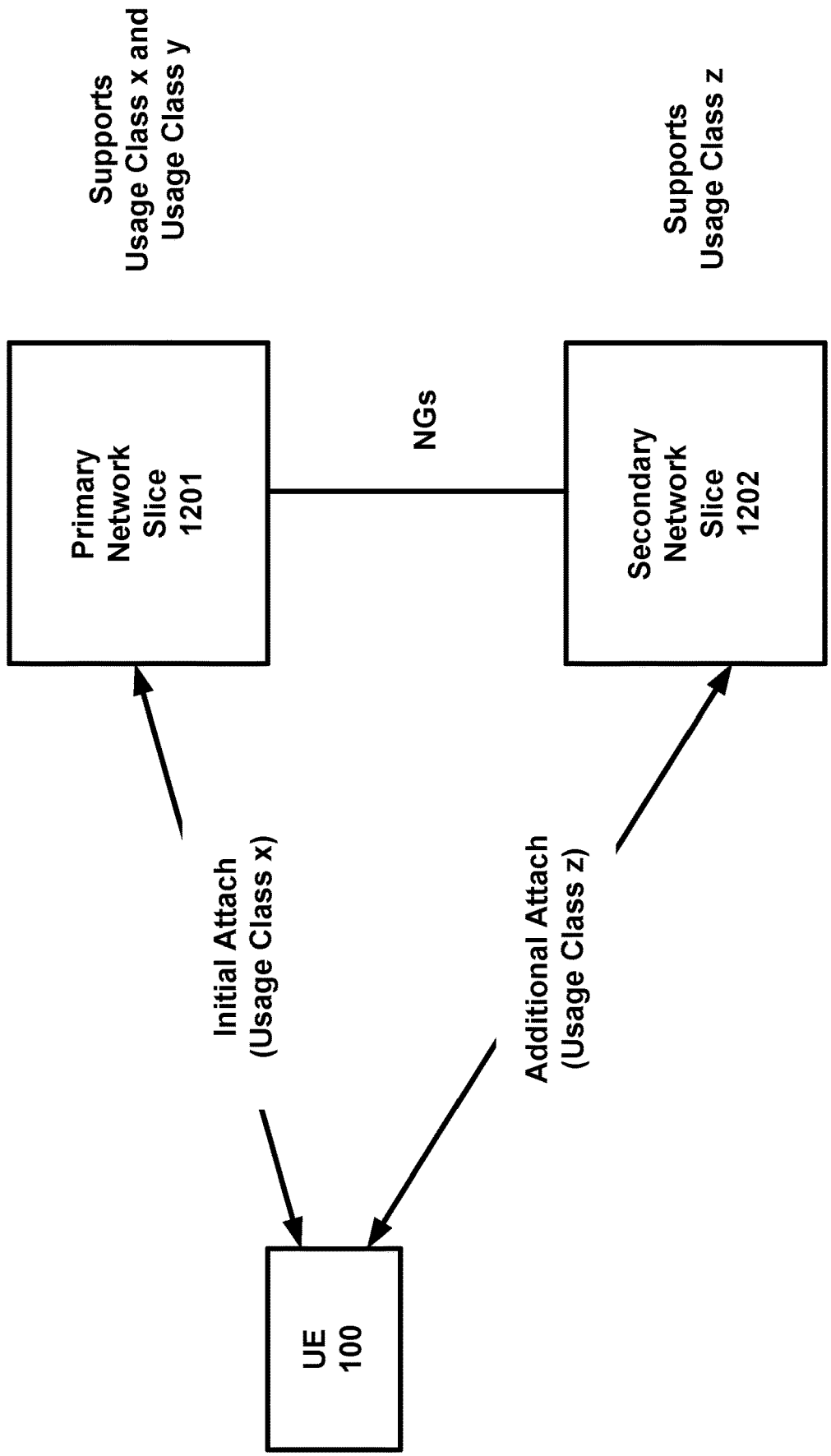
FIG. 13 is an example diagram depicting multiple slices per UE as per an aspect of an embodiment of the present disclosure.

FIG. 13 is an example diagram depicting multiple slices per UE as per an aspect of an embodiment of the present invention. The network slice instances may be independent and they may not share any CP or UP functions. They may share common databases such as the subscription database and/or policy databases. Network slices instances may communicate via the NGs interface. Each network slice instance may have a unique slice identity that may be resolved to an IP address for communication via NGs. A UE 100 may be simultaneously attached to multiple network slice instances. One of these slices may be the primary network slice 1201 for the UE 100 and all the others may be secondary network slices 1202 for the UE 100. The first attach performed by the UE 100 may be called initial attach and attaches the UE 100 to the primary network slice 1201, and a subsequent attach may be called additional attach and attaches the UE 100 to a secondary network slice 1202.

A Network Slice may include at least one of the following: the Core Network Control Plane and user plane Network Functions; the 5G Radio Access Network; and/or the N3IWF functions to the non-3GPP Access Network. Network slices may differ for supported features and network functions implementation. The operator may deploy multiple Network Slice instances delivering the same features but for different groups of UEs, e.g. as they deliver a different committed service and/or because they may be dedicated to a customer. The NSSF may store the mapping information between slice instance ID and NF ID (or NF address).

A single UE may simultaneously be served by one or more network slice instances via a 5G-AN. In an example, a single UE may be served by k network slices (e.g. k=8, 16, etc) at a time. An AMF instance serving the UE logically belongs to a Network Slice instances serving the UE.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a Network Slice. An S-NSSAI may be comprised of: a slice/service type (SST), which may refer to the expected Network Slice behavior in terms of features and services; and/or a slice differentiator (SD). A slice differentiator may be optional information that complements the slice/service type(s) to allow further differentiation for selecting an network slice instance from potentially multiple network slice instances that comply with the indicated slice/service type. This information may be referred to as SD. The same Network Slice instance may be selected employing different S-NSSAIs. The CN part of a Network Slice instance(s) serving a UE may be selected by CN.

Subscription data may include the S-NSSAI(s) of the Network Slices that the UE subscribes to. One or more S-NSSAIs may be marked as default S-NSSAI. In an example, k S-NSSAI may be marked Default S-NSSAI (e.g. k=8, 16, etc). In an example, the UE may subscribe to more than 8 S-NSSAI.

A UE may be configured by the HPLMN with a Configured NSSAI per PLMN. Upon successful completion of a UE's Registration procedure, the UE may obtain from the AMF an Allowed NSSAI for this PLMN, which may include one or more S-NSSAIs.

The Allowed NSSAI may take precedence over the Configured NSSAI for this PLMN. The UE may use the S-NSSAIs in the Allowed NSSAI corresponding to a Network Slice for the subsequent Network Slice selection related procedures in the serving PLMN.

The establishment of user plane connectivity to a data network via a network slice instance(s) may comprise one or more of the following steps: performing a RM procedure to select an AMF that supports the required Network Slices; establishing one or more PDU session to the required Data network via the Network Slice Instance(s).

When a UE registers with a PLMN, if the UE for this PLMN has a configured NSSAI or an allowed NSSAI, the UE may provide to the network in RRC and NAS layer a Requested NSSAI containing the S-NSSAI(s) corresponding to the slice(s) to which the UE attempts to register, in addition to the temporary user ID if one was assigned to the UE. The Requested NSSAI may be either: the Configured-NSSAI; the Allowed-NSSAI.

In an example, when a UE registers with a PLMN, if for this PLMN the UE has no Configured NSSAI or Allowed NSSAI, the RAN may route NAS signalling from/to this UE to/from a default AMF.

The network, based on local policies, subscription changes and/or UE mobility, may change the set of permitted Network Slice(s) to which the UE is registered. The network may perform such change during a Registration procedure or trigger a notification towards the UE of the change of the supported Network Slices using an RM procedure (which may trigger a Registration procedure). The Network may provide the UE with a new Allowed NSSAI and Tracking Area list.

During a Registration procedure in a PLMN, in case the network decides that the UE should be served by a different AMF based on Network Slice(s) aspects, then the AMF that first received the Registration Request may redirect the Registration request to another AMF via the RAN or via direct signaling between the initial AMF and the target AMF. The network operator may provision the UE with Network Slice selection policy (NSSP). The NSSP includes one or more NSSP rules. An NSSP rule may associate an application with a certain S-NSSAI. A default rule which matches one or more applications to a S-NSSAI may also be included. When a UE application associated with a specific S-NSSAI requests data transmission, then if the UE has one or more PDU sessions established corresponding to the specific S-NSSAI, the UE may route the user data of this application in one of these PDU sessions, unless other conditions in the UE prohibit the use of these PDU sessions. If the application provides a DNN, then the UE may consider also this DNN to determine which PDU session to use. When a UE application associated with a specific S-NSSAI requests data transmission, then if the UE does not have a PDU session established with this specific S-NSSAI, the UE may request a new PDU session corresponding to this S-NSSAI and with the DNN that may be provided by the application. In order for the RAN to select a proper resource for supporting network slicing in the RAN, RAN may be aware of the Network Slices used by the UE. The AMF may select an SMF in a Network Slice instance based on S-NSSAI, DNN and other information e.g. UE subscription and local operator policies, when the UE triggers the establishment of a PDU session. The selected SMF may establish a PDU session based on S-NSSAI and DNN.

In an example, in order to support network-controlled privacy of slice information for the slices the UE accesses, when the UE is aware or configured that privacy considerations apply to NSSAI: The UE may not include NSSAI in NAS signaling unless the UE has a NAS security context and the UE may not include NSSAI in unprotected RRC signaling.

For roaming scenarios, the Network Slice specific network functions in VPLMN and HPLMN may be selected based on the S-NSSAI provided by the UE during PDU connection establishment. If a standardized S-NSSAI is used, then selections of slice specific NF instances may be done by each PLMN based on the provided S-NSSAI. Otherwise, the VPLMN may map the S-NSSAI of HPLMN to a S-NSSAI of VPLMN based on roaming agreement (including mapping to a default S-NSSAI of VPLMN). The selection of slice specific NF instance in VPLMN may be done based on the S-NSSAI of VPLMN. The selection of any slice specific NF instance in HPLMN may be based on the S-NSSAI of HPLMN.

Implementation of the existing technologies for a network slice may have issues in supporting an isolated network slice. Implementation of the existing technologies have issues how to implement an isolated network slice. Implementation of the existing technologies have issues how to select a proper SMF for an isolated network slice. Implementation of the existing technologies have issues how (R)AN and AMF select the same NRF for the network function selection. Implementation of the existing technologies have issues how an NRF correlate all network functions for the same isolated network slice.

Example embodiments provides enhanced mechanisms to implement an isolated network slice. Example embodiments provides enhanced mechanisms to select a proper SMF for different kind/level of an isolated network slice. Example embodiments provides enhanced mechanisms to ensure (R)AN and AMF select the same NRF for the network function selection. Example embodiments provides enhanced mechanisms to correlate all network functions for the same isolated network slice by an NRF.

Example 1

Figure 18:
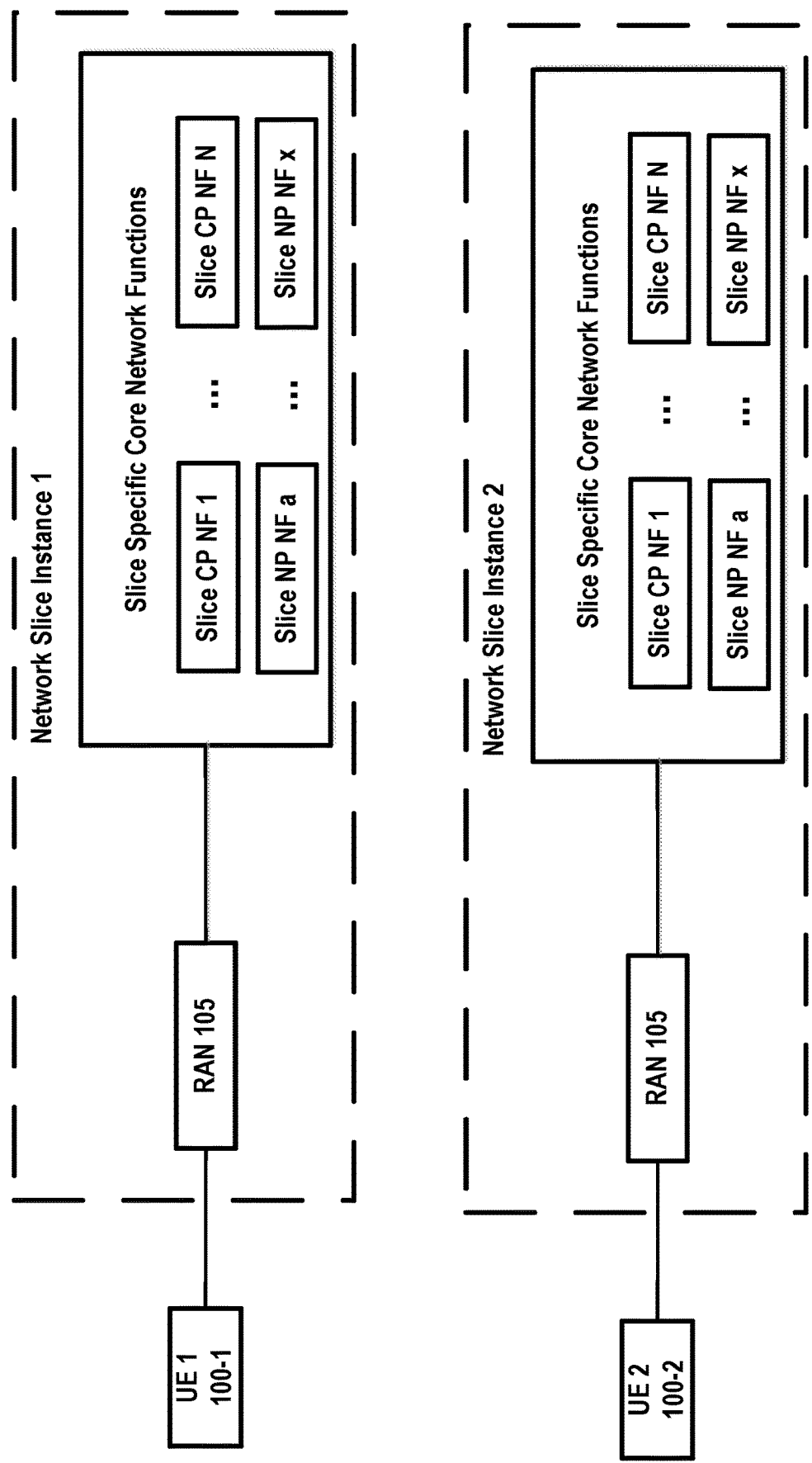
FIG. 18 is an example diagram depicting fully isolated network slices as per an aspect of an embodiment of the present disclosure.
Figure 19:
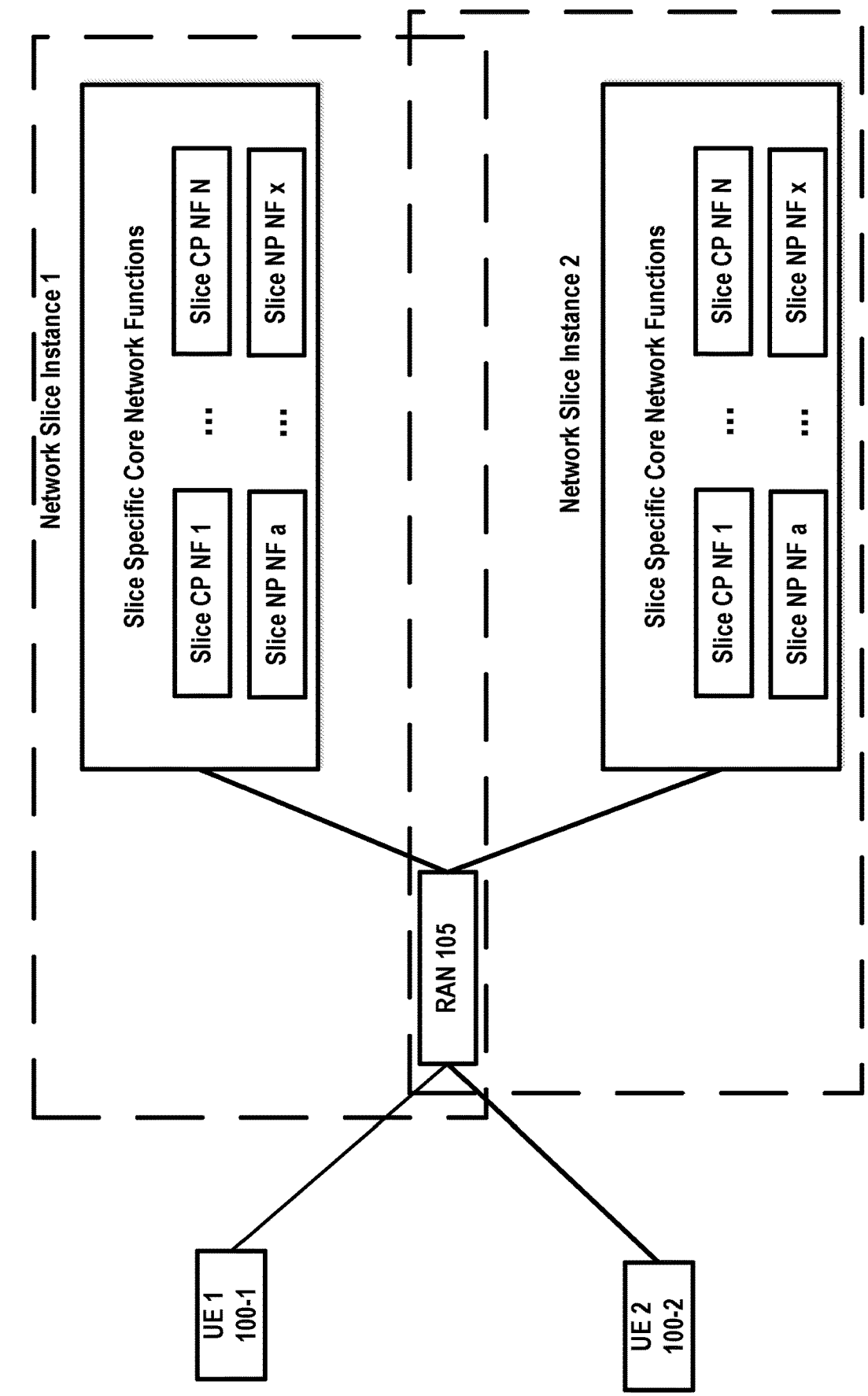
FIG. 19 is an example diagram depicting partly isolated network slices with (R)AN shared as per an aspect of an embodiment of the present disclosure.
Figure 20:
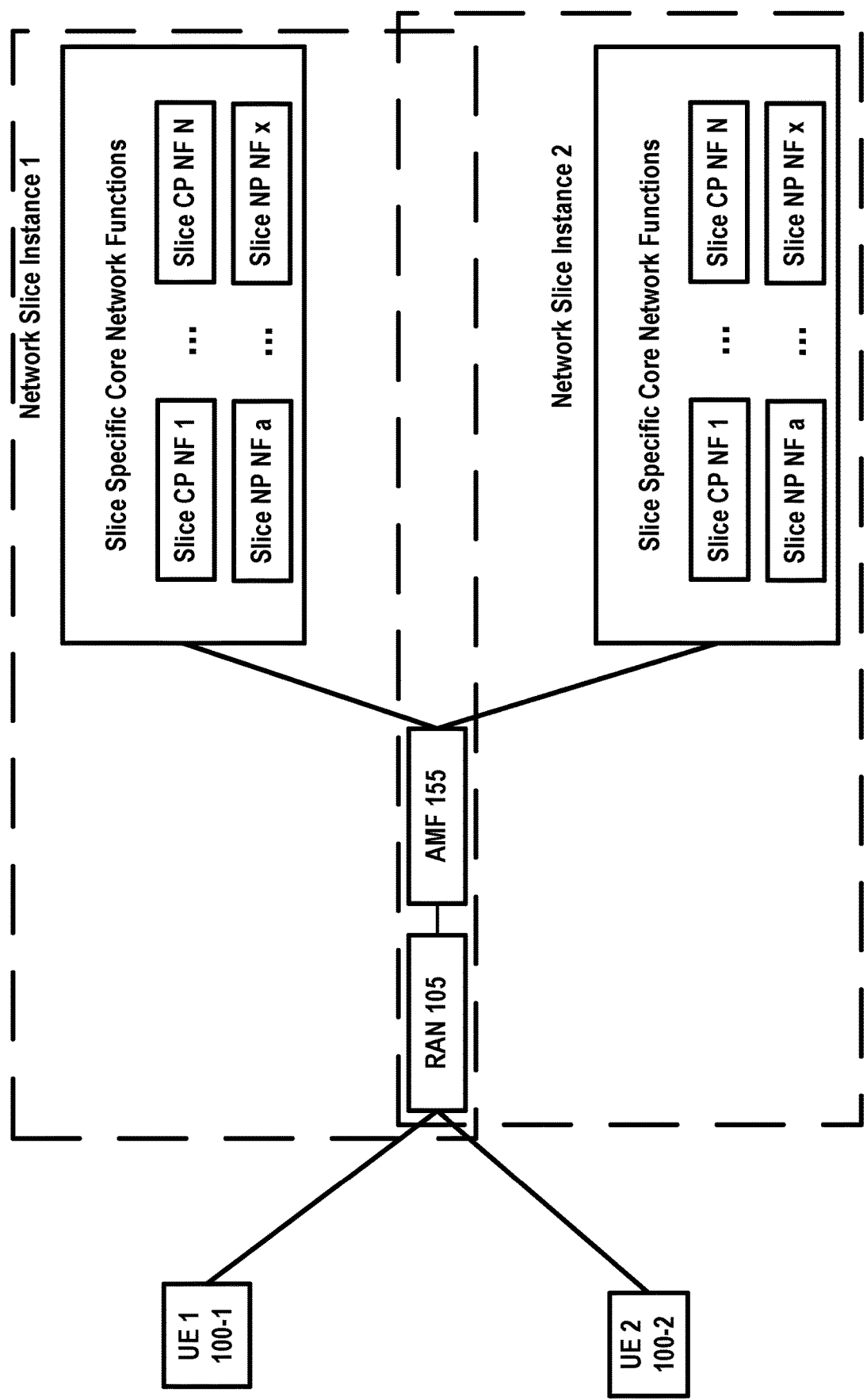
FIG. 20 is an example diagram depicting partly isolated network slice with (R)AN and AMF shared as per an aspect of an embodiment of the present disclosure.

In an example, the UE may request fully isolated network slice(s) when performing the registration procedure, an (R)AN may request an NRF to select an AMF for the fully isolated network slice(s), and the AMF may request the same NRF to select an SMF for the same fully isolated network slice. There are example different kind/level of isolated network slices. In an example, a fully isolated network slice may be a kind/level of isolated network slice. For a fully isolated network slice, a network slice instance may not share neither the (R)AN nor the core network (e.g. comprising the control plane and user plane) network function with any other network slice instance. As an example, network slice instance 1 and network slice instance 2 in FIG. 18 are two fully isolated network slices, no network functions are shared by these two network slice instances. In an example, a partly isolated network slice with (R)AN shared may be a kind/level of isolated network slice. For a partly isolated network slice with (R)AN shared, (R)AN belonging to an isolated network slice instance may be the NF that can be seen from the outside of the network slice instance (e.g. from the PLMN level NRF). FIG. 19 shows an example, where network slice instance 1 and network slice instance 2 are two partly isolated network slices, (R)AN 105 may be shared by the network slice instance 1 and network slice instance 2. In an example, a partly isolated network slice with (R)AN and AMF shared may be a kind/level of isolated network slice. For a partly isolated network slice with (R)AN and AMF shared, both (R)AN and AMF(s) belonging to an isolated network slice instance are NFs that can be seen from the outside of the network slice instance. FIG. 20 shows an example, where network slice instance 1 and network slice instance 2 are two partly isolated network slices, (R)AN 105 and AMF 155 may be shared by the network slice instance 1 and network slice instance 2.

Figure 14:
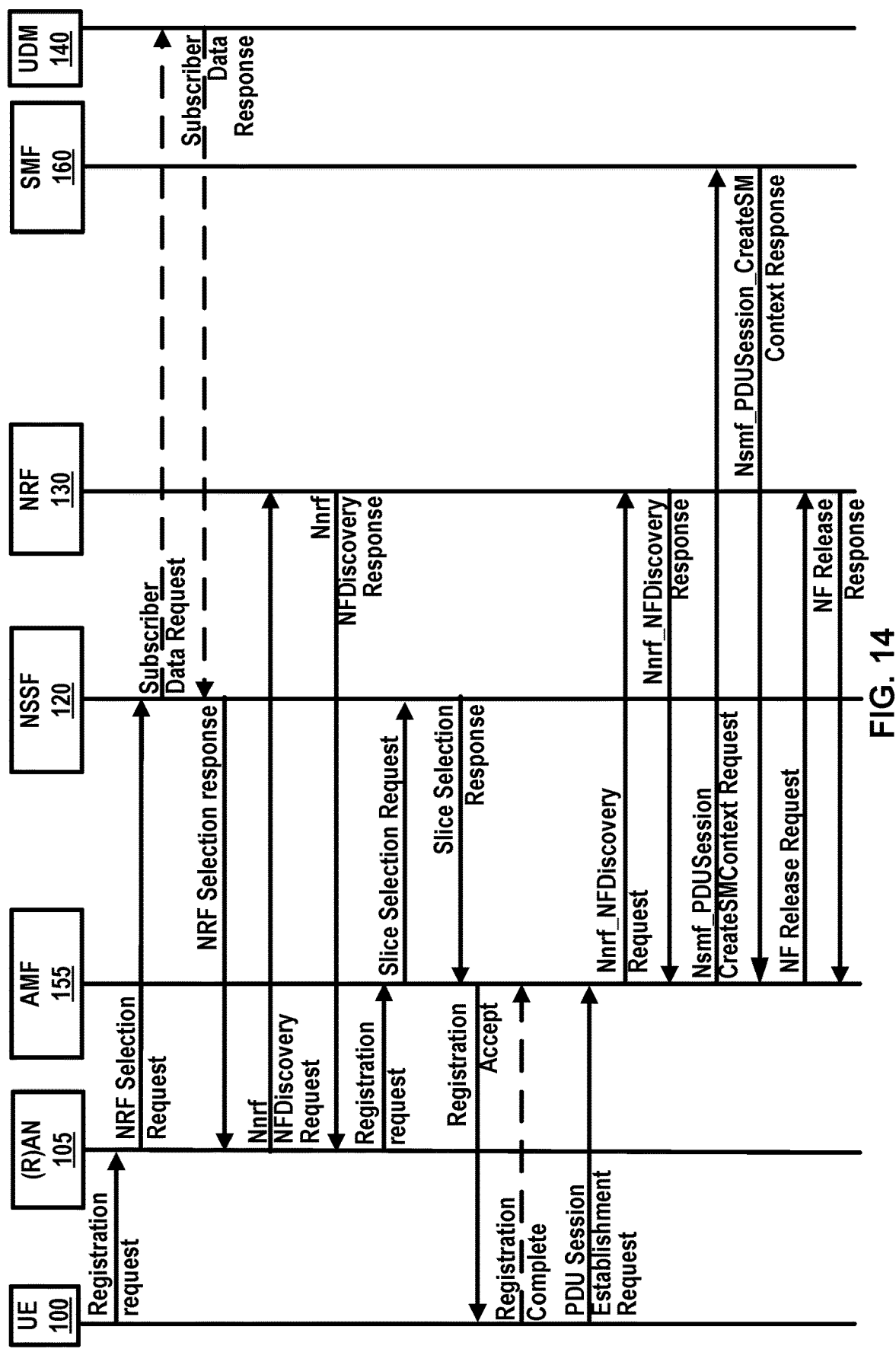
FIG. 14 is an example call flow diagram as per an aspect of an embodiment of the present invention.

FIG. 14 shows an example call flow which may comprise one or more actions. UE 100 may send a registration request to a (R)AN 105 comprising an AN message. The AN message may comprise AN parameters and/or a RM-NAS Registration Request, wherein the RM-NAS Registration Request may comprise at least one of: a registration type, UE identifier(s) (e.g. SUPI and/or 5G-GUTI), security parameters, a requested NSSAI, DNN, A UE 5GCN Capability, a PDU session status, PDU session(s) to be re-activated, a follow on request, or a MICO mode preference. The Requested NSSAI may comprise one or more S-NSSAIs corresponding to one or more network slices or network slice instances to which the UE may register. The DNN is the data network name, which may be equivalent to an APN the UE may access. The PDU session status and/or PDU session(s) to be re-activated may comprise the PDU session ID(s). The UE 100 may comprise network slice isolation information in the registration request, and the network slice isolation information may comprise one of the following network slice isolation type/level for each of the requested S-NSSAI and/or the requested S-NSSAI related network slice instance: Fully isolated network slice; Partly isolated network slice with (R)AN shared; or Partly isolated network slice with (R)AN and AMF shared. As an example, the network slice isolation information may be comprised in S-NSSAI as illustrated in example FIG. 21. As an example, the network slice isolation information may be comprised in a new information element as illustrated in example FIG. 22. In an example, a value of fully isolated network slice may be set by the UE 100 for the network slice isolation type (NSIT). As an example, the network slice isolation information may comprise a parameter to indicate the network slice is logically isolated or physically isolated from the one or more other network slices.

In response to the message received from the UE 100, the (R)AN 105, may send to an NSSF 120 a message (e.g. NRF selection request) to select an NRF, and the message may comprise one or more of the following information received from the UE 100: Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PLMN ID of the SUPI; PDU session ID(s); and DNN.

In response to the message received from the (R)AN 105, the NSSF 120 may send the UDM 140 a message (e.g. subscriber data request) to request the subscription informa-tion of the UE 100, the message may comprise one or more of the following information: Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PLMN ID of the SUPI; PDU session ID(s); and DNN.

In response to the message received from the NSSF 120, the UDM 140 may send to the NSSF 120 a response message (e.g. subscriber data response), and the response message may comprise one or more information. As an example, the response message may comprise an address/identifier of an NRF (e.g. IP address and/or FQDN of NRF 130). Based on the PLMN ID received from the NSSF 120, user subscription and/or location operator policy, the UDM may select an NRF (e.g. NRF 130) supporting the network function selection for the isolated network slice(s) per PLMN. In an example, there may be one NRF per PLMN supporting the network function selection for all the isolated network slice(s) of this PLMN, this NRF may ensure the selected network function meet the requirement of the isolated network slice(s) of this PLMN. For example, the NRF may select an AMF 1 serving fully isolated network slice 1, the NRF may not select this AMF 1 serving any other network slices. In an example, there may be more than one NRFs per PLMN supporting the network function selection for all the isolated network slice(s) of this PLMN, these NRFs may share the network selection information and ensure the requirement of the isolated network slice(s) of this PLMN. For example, NRF 1 may select AMF 1 serving a fully isolated network slice 1, the NRF 1 may send the network selection information (e.g. AMF 1 serving a fully isolated network slice 1) to other NRFs, and the other NRFs may not select the AMF 1 serving any other network slices when receiving a request to select an AMF. In an example, there may be one NRF per PLMN supporting the network function selection for all the isolated network slice(s) of this PLMN. The NRF address/identifier information (e.g. IP address and/or FQDN) may be configured in UDM and/or in NSSF. As an example, the response message may comprise Subscribed NSSAI and/or subscribed NSSAI related network slice instance(s), where the subscribed NSSAI may comprise one or more S-NSSAIs corresponding to one or more network slices or network slice instances to which the UE subscribed. As an example, the response message may comprise Network slice isolation information applied to the subscribed NSSAI (e.g. network slice isolation type/level applied to the subscribed NSSAI and/or the subscribed NSSAI related network slice instance(s)). As an example, the response message may comprise UE identifier(s) (e.g. SUPI and/or 5G-GUTI). As an example, the response message may comprise PDU session ID(s). As an example, the response message may comprise DNN.

In response to the message received from the UDM 140, the NSSF 120 may take one or more actions. In an example action, the NSSF 120 may determine/select NRF based on one or more of the following information: Address/identifier of the NRF (e.g. IP address and/or FQDN of NRF 130) received from the UDM 140; Requested NSSAI; Network slice isolation information applied to the requested NSSAI received from the (R)AN 105; Subscribed NSSAI and/or subscribed NSSAI related network slice instance(s); Network slice isolation information applied to the subscribed NSSAI received from the UDM 140; UE identifier(s) (e.g. SUPI and/or 5G-GUTI); DNN; local operator policies configured in NSSF 120; and subscription information of UE configured in NSSF 120 or received from the UDM 140. In an example, the NSSF 120 may select NRF 130 which may support the network function selection for the fully isolated network slice(s) for the requested NSSAI and/or subscribed NSSAI. In an example action, the NSSF 120 may maintain the context information for the isolated network slice(s), which may comprise one or more of the following information: Requested NSSAI; Network slice isolation information applied to the requested NSSAI; Subscribed NSSAI and/or subscribed NSSAI related network slice instance(s); Network slice isolation information applied to the subscribed NSSAI; Address/identifier of the selected NRF (e.g. IP address and/or FQDN of NRF 130), that the NRF may support the isolated network slice(s) for the subscribed NSSAI and/or the requested NSSAI; UE identifier(s) (e.g. SUPI and/or 5G-GUTI); PDU session ID(s); DNN. In an example action, in response to the message received from the (R)AN 105, the NSSF 120 may send to the (R)AN 105 a response message (e.g. NRF selection response) comprising one or more of the following information: Address/identifier of the selected NRF (e.g. IP address and/or FQDN of NRF 130), that the selected NRF may support the network function selection for the isolated network slice(s) per PLMN, per requested NSSAI and/or subscribed NSSAI; UE identifier(s) (e.g. SUPI and/or 5G-GUTI); Subscribed NSSAI and/or subscribed NSSAI related network slice instance(s); Network slice isolation information applied to the subscribed NSSAI (e.g. network slice isolation type/level applied to the subscribed NSSAI and/or the subscribed NSSAI related network slice instance(s)); and DNN.

In response to the message received from the NSSF 120, the (R)AN 105 may select the received NRF 130 and send to the NRF 130 a message (e.g. Nnrf_NFDiscovery_Request) to select an AMF serving the isolated network slice(s). The message may comprise one or more of the following information: Requested NSSAI; Network slice isolation information applied to the requested NSSAI; Subscribed NSSAI and/or subscribed NSSAI related network slice instance(s); Network slice isolation information applied to the subscribed NSSAI received from the NSSF 120; UE identifier(s) (e.g. SUPI and/or 5G-GUTI); PDU session ID(s); and DNN.

Based on the information received from the (R)AN 105 (e.g. network slice isolation information applied to the subscribed NSSAI), the NRF 130 may take one or more actions. In an example action, the NRF 130 may determine/select AMF(s) supporting the isolated network slice(s) for the subscribed NSSAI and/or the requested NSSAI. For the selected AMF(s) supporting fully isolated network slice(s) per PLMN and/or per subscribed NSSAI and/or the requested NSSAI, the NRF 130 may mark the selected AMF(s) and may not select it (them) for any other network slice(s). In an example action, the NRF 130 may maintain the context information for the isolated network slice(s), which may comprise one or more of the following information: Requested NSSAI; Network slice isolation information applied to the requested NSSAI; Subscribed NSSAI and/or subscribed NSSAI related network slice instance(s); Network slice isolation information applied to the subscribed NSSAI; Selected AMF(s) supporting the isolated network slice(s) for the subscribed NSSAI and/or the requested NSSAI; UE identifier(s) (e.g. SUPI and/or 5G-GUTI); PDU session ID(s); and DNN. In an example action, the NRF 130 may send to (R)AN 105 a response message (e.g. Nnrf_NF-Discovery_Response) comprising one or more of the following information: AMF(s) (e.g. IP address(es) and/or FQDN of AMF(s)) supporting the isolated network slice(s) for the subscribed NSSAI and/or the requested NSSAI; UE identifier(s) (e.g. SUPI and/or 5G-GUTI); Requested NSSAI; Subscribed NSSAI; and DNN.

In response to the message received from the NRF 130, the (R)AN 105 may select one of AMFs (e.g. AMF 155) received from the NRF 130 and send to the AMF 155 a message (e.g. registration request) comprising the information received from the UE 100. In response to the message received from the (R)AN 105, the AMF 155 may send to the NSSF 120 a message (e.g. slice selection request) (e.g. slice selection request) to request allowed NSSAI and/or allowed NSSAI related network slice instance(s), and the message may comprise one or more of the following information received from the UE 100: Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PDU session ID(s); and DNN.

In response to the message received from the AMF 155, the NSSF 120 may take one or more actions. In an example action, the NSSF 120 may determine allowed NSSAI and/or allowed NSSAI related network slice instance(s). The NSSF 120 may determine/create the allowed NSSAI and/or allowed NSSAI related network slice instance(s) based on one or more of the following information: Requested NSSAI received from the AMF 155; Network slice isolation information applied to the requested NSSAI received from the AMF 155; Subscribed NSSAI and/or subscribed NSSAI related network slice instance(s) received from the UDM 140; Network slice isolation information applied to the subscribed NSSAI received from the UDM 140; UE identifier(s) (e.g. SUPI and/or 5G-GUTI); DNN; local operator policies configured in NSSF 120; and subscription information of UE configured in NSSF 120 or received from the UDM 140. The allowed NSSAI may comprise one or more S-NSSAIs corresponding to one or more network slices or network slice instances to which the UE 100 is allowed to access. The NSSF may determine the network slice isolation information applied to the allowed NSSAI and/or the allowed NSSAI related network slice instance(s)). In an example action, the NSSF 120 may determine/select NRF supporting the isolated network slice(s) for the allowed NSSAI and/or the subscribed NSSAI. The NSSF 120 may determine/select the NRF based on the maintained context information for the isolated network slice(s) and the information received from the AMF 155. As an example, the NSSF 120 may use one or more of the following information received from the AMF 155 to look up the maintained context information for the isolated network slice(s): Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PDU session ID(s); and DNN. The NSSF 120 may select the same NRF (e.g. NRF 130) for the same PLMN and/or same isolated network slice(s) per NSSAI (e.g. the allowed NSSAI) and/or NSSAI related network slice instance(s). The NSSF may update the maintained context information for the isolated network slice(s) by adding the following information: Allowed NSSAI and/or allowed NSSAI related network slice instance(s); and Network slice isolation information applied to the allowed NSSAI (e.g. network slice isolation type/level applied to the allowed NSSAI and/or the allowed NSSAI related network slice instance(s)). In an example action, in response to the message received from the AMF 155, the NSSF 120 may send to the AMF 155 a response message (e.g. slice selection response) comprising one or more of the following information: Address/identifier of the selected NRF (e.g. IP address and/or FQDN of NRF 130); Allowed NSSAI and/or allowed NSSAI related network slice instance(s); Network slice isolation information applied to the allowed NSSAI (e.g. network slice isolation type/level applied to the allowed NSSAI and/or the allowed NSSAI related network slice instance(s)); UE identifier(s) (e.g. SUPI and/or 5G-GUTI); PDU session ID(s); and DNN.

The AMF 155 may continue the registration procedure, and may send to the UE 100 a registration accept message comprising one or more of the following information: Allowed NSSAI and/or allowed NSSAI related network slice instance(s); Network slice isolation information applied to the allowed NSSAI (e.g. network slice isolation type/level applied to the allowed NSSAI and/or the allowed NSSAI related network slice instance(s)); Subscribed NSSAI and/or subscribed NSSAI related network slice instance(s); Network slice isolation information applied to the subscribed NSSAI; UE identifier(s) (e.g. SUPI and/or 5G-GUTI); PDU session ID(s); and DNN.

In response to the message received from the AMF 155, the UE 100 may send to the AMF 155 a registration complete message. The UE 100 may send to the AMF 155 a NAS Message comprising at least one of: S-NSSAI, DNN, PDU Session ID, Request type, UE 5GCN Capability, or N1 SM container. The N1 SM container may comprise PDU Session Establishment Request. The UE 100 may initiate the UE requested PDU session establishment procedure by the transmission of a NAS message containing a PDU session establishment request within the N1 SM container. The PDU session establishment request may include a PDU Type (e.g. Ethernet), SSC mode, Protocol Configuration Options, and a PDU session ID generated by the UE. The S-NSSAI may be one of the allowed S-NSSAIs, and the UE may additionally comprise network slice isolation information applied to the S-NSSAI.

In response to the message received from the UE 100, the AMF 155 may send to the NRF 130 a message to select an SMF for isolated network slice(s), the message may comprise one or more of the following information: Subscribed NSSAI and/or subscribed NSSAI related network slice instance(s); Network slice isolation information applied to the subscribed NSSAI; S-NSSAI; network slice isolation information applied to the S-NSSAI; UE identifier(s) (e.g. SUPI and/or 5G-GUTI); PDU session ID; and DNN.

Based on the information received from the AMF 155 (e.g. network slice isolation information applied to the subscribed NSSAI and/or network slice isolation information applied to the S-NSSAI), the NRF 130 may take one or more actions. In an example action, the NRF 130 may determine/select SMF supporting the isolated network slice(s) for the subscribed NSSAI and/or the requested NSSAI. For the selected SMF (e.g. SMF 160) supporting fully isolated network slice(s) per PLMN and/or per subscribed NSSAI and/or the requested NSSAI, the NRF 130 may mark the selected SMF and may not select it for any other network slice(s). In an example action, the NRF 130 may update the context information for the isolated network slice(s) by adding one or more of the following information: S-NSSAI; network slice isolation information applied to the S-NSSAI; Selected SMF supporting the isolated network slice(s) for the S-NSSAI. In an example action, the NRF 130 may send to AMF 155 a response message (e.g. Nnrf_NF-Discovery_Response) comprising one or more of the following information: Address/identifier of the SMF (e.g. IP address and/or FQDN of selected SMF 160), that the SMF may support the isolated network slice(s) for the S-NSSAI; UE identifier(s) (e.g. SUPI and/or 5G-GUTI); PDU session ID; and DNN.

In response to the message received from the NRF 130, the AMF 155 may send to the selected SMF 160 a message (e.g. Nsmf_PDUSession_CreateSMContext request) to establish a PDU session. In response to the message received from the AMF 155, the SMF 160 may send to the AMF 155 a response message (e.g. Nsmf_PDUSession_CreateSMContext response). When the isolated network slice has been released, the AMF 155 may send to the NRF 130 a message (e.g. NF release request), the message may comprise one or more of the following information: S-NSSAI; Requested NSSAI; Subscribed NSSAI; Address/identifier of the selected AMF (e.g. IP address and/or FQDN of AMF 155; Address/identifier of the selected SMF (e.g. IP address and/or FQDN of SMF 160); UE identifier(s) (e.g. SUPI and/or 5G-GUTI); PDU session ID; and DNN.

In response to the message received from the AMF 155, the NRF 130 may release the AMF(s) and/or SMF applied to the isolated network slice(s) (e.g. release the resource and remove the mark) and may select the released AMF(s) and/or SMF using for any other network slice(s) later. The NRF 130 may send to the AMF 155 a response message (e.g. NF release response).

Example 2

As an example, a (R)AN may request from an NSSF the allowed network slice (s) information and NRF information when selecting an AMF; after receiving the selected AMF, the allowed network slice (s) information and NRF information from the NSSF, the (R)AN may send allowed network slice (s) information and NRF information to the selected AMF, and the AMF may use such information for the selection of SMF.

Figure 15:
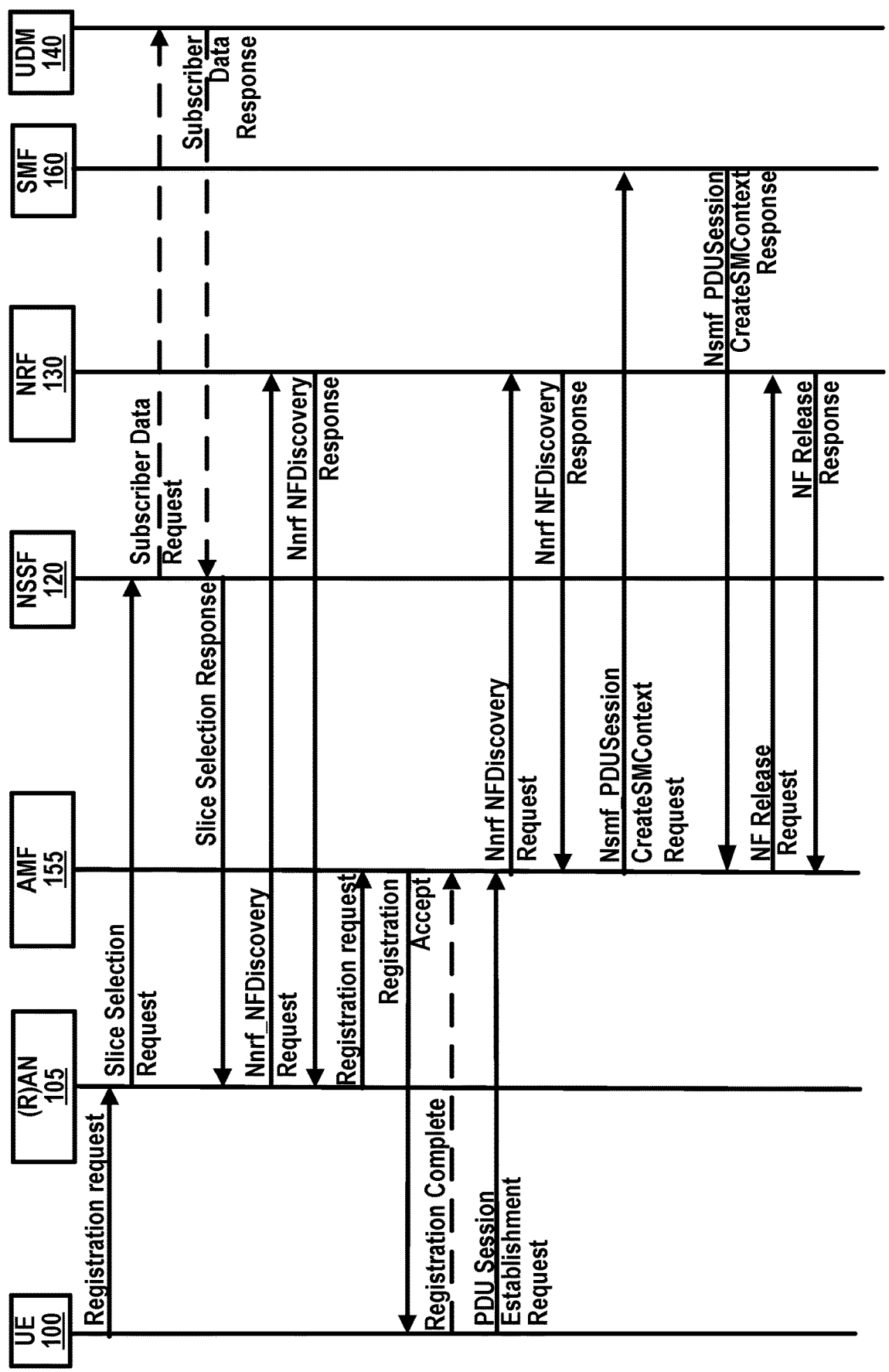
FIG. 15 is an example call flow diagram as per an aspect of an embodiment of the present disclosure.

FIG. 15 shows an example call flow which may comprise one or more actions. UE 100 may send a registration request to a (R)AN 105 comprising an AN message. The AN message may comprise AN parameters and/or a RM-NAS Registration Request, wherein the RM-NAS Registration Request may comprise at least one of: a registration type, UE identifier(s) (e.g. SUPI and/or 5G-GUTI), security parameters, a requested NSSAI, DNN, A UE 5GCN Capability, a PDU session status, PDU session(s) to be re-activated, a follow on request, or a MICO mode preference. The Requested NSSAI may comprise one or more S-NSSAIs corresponding to one or more network slices or network slice instances to which the UE may register. The DNN is the data network name, which may be equivalent to an APN the UE may access. The PDU session status and/or PDU session(s) to be re-activated may comprise the PDU session ID(s). The UE 100 may comprise the network slice isolation information in the registration request, in this example, a value of partly isolated network slice with (R)AN shared may be set by the UE 100 for the network slice isolation type (NSIT). The network slice isolation information may comprise a parameter to indicate the network slice is logically isolated or physically isolated from the one or more other network slices. In this example, physically isolated network slice indication is comprised in the network slice isolation information.

In response to the message received from the UE 100, the (R)AN 105, may send to an NSSF 120 a message (e.g. NRF selection request) to select an NRF, and the message may comprise one or more of the following information received from the UE 100: Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PLMN ID of the SUPI; PDU session ID(s); and DNN.

In response to the message received from the (R)AN 105, the NSSF 120 may send the UDM 140 a message (e.g. subscriber data request) to request the subscription information of the UE 100, the message may comprise one or more of the following information: Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PLMN ID of the SUPI; PDU session ID(s); and DNN.

In response to the message received from the NSSF 120, the UDM 140 may send to the NSSF 120 a response message (e.g. subscriber data response), and the message may comprise one or more of the following information: Subscribed NSSAI and/or subscribed NSSAI related network slice instance(s), where the subscribed NSSAI may comprise one or more S-NSSAIs corresponding to one or more network slices or network slice instances to which the UE subscribed; Network slice isolation information applied to the subscribed NSSAI (e.g. network slice isolation type/level applied to the subscribed NSSAI and/or the subscribed NSSAI related network slice instance(s)); UE identifier(s) (e.g. SUPI and/or 5G-GUTI); PDU session ID(s); and DNN.

In response to the message received from the UDM 140, the NSSF 120 may take one or more actions. In an example action, the NSSF 120 may determine allowed NSSAI and/or allowed NSSAI related network slice instance(s): The NSSF 120 may determine the allowed NSSAI and/or allowed NSSAI related network slice instance(s) based on one or more of the following information: Requested NSSAI; Network slice isolation information applied to the requested NSSAI; Subscribed NSSAI and/or subscribed NSSAI related network slice instance(s); Network slice isolation information applied to the subscribed NSSAI; UE identifier(s) (e.g. SUPI and/or 5G-GUTI); DNN; local operator policies configured in NSSF 120; and subscription information of UE configured in NSSF 120 or received from the UDM 140. The allowed NSSAI may comprise one or more S-NSSAIs corresponding to one or more network slices or network slice instances to which the UE 100 is allowed to access. The NSSF may determine the network slice isolation information applied to the allowed NSSAI and/or the allowed NSSAI related network slice instance(s)). In an example action, the NSSF 120 may determine/select NRF based on one or more of the following information: Requested NSSAI; Network slice isolation information applied to the requested NSSAI; Subscribed NSSAI and/or subscribed NSSAI related network slice instance(s); Network slice isolation information applied to the subscribed NSSAI; Allowed NSSAI and/or allowed NSSAI related network slice instance(s); Network slice isolation information applied to the allowed NSSAI; UE identifier(s) (e.g. SUPI and/or 5G-GUTI); DNN; local operator policies configured in NSSF 120; and subscription information of UE configured in NSSF 120 or received from the UDM 140. In an example, the NSSF 120 may select an PLMN level NRF which may support the network function selection for the partly isolated network slice(s) with (R)AN shared and/or physically isolated network slice(s) per PLMN and/or per allowed NSSAI and/or subscribed NSSAI. In an example action, the NSSF 120 may maintain the context information for the isolated network slice(s), which may comprise one or more of the following information: Requested NSSAI; Network slice isolation information applied to the requested NSSAI; Subscribed NSSAI and/or subscribed NSSAI related network slice instance(s); Network slice isolation information applied to the subscribed NSSAI; Allowed NSSAI and/or allowed NSSAI related network slice instance(s); Network slice isolation information applied to the allowed NSSAI; Selected NRF supporting the isolated network slice(s) for the allowed NSSAI and/or the subscribed NSSAI; UE identifier(s) (e.g. SUPI and/or 5G-GUTI); PDU session ID(s); and DNN. In an example action, in response to the message received from the (R)AN 105, the NSSF 120 may send to the (R)AN 105 a response message (e.g. slice selection response) comprising one or more of the following information: Allowed NSSAI and/or allowed NSSAI related network slice instance(s); Network slice isolation information applied to the allowed NSSAI; Subscribed NSSAI and/or subscribed NSSAI related network slice instance(s); Network slice isolation information applied to the subscribed NSSAI (e.g. network slice isolation type/level applied to the subscribed NSSAI and/or the subscribed NSSAI related network slice instance(s)); Address/identifier of the NRF (e.g. IP address and/or FQDN of the selected NRF 130; UE identifier(s) (e.g. SUPI and/or 5G-GUTI); PDU session ID(s); and DNN.

In response to the message received from the NSSF 120, the (R)AN 105 may select the received NRF 130 and send to the NRF 130 a message (e.g. Nnrf_NFDiscovery_Request) to select an AMF serving the isolated network slice(s). The message may comprise one or more of the following information: Allowed NSSAI and/or allowed NSSAI related network slice instance(s); Network slice isolation information applied to the allowed NSSAI; Subscribed NSSAI and/or subscribed NSSAI related network slice instance(s); Network slice isolation information applied to the subscribed NSSAI; UE identifier(s) (e.g. SUPI and/or 5G-GUTI); PDU session ID(s); and DNN.

Based on the information received from the (R)AN 105 (e.g. network slice isolation information applied to the subscribed NSSAI), the NRF 130 may take one or more actions. In an example action, the NRF 130 may determine/select AMF(s) supporting the isolated network slice(s) for the allowed NSSAI and/or the subscribed NSSAI. For the selected AMF(s) supporting partly isolated network slice(s) with (R)AN shared and/or physically isolated network slice(s) per PLMN and/or per allowed NSSAI and/or subscribed NSSAI, the NRF 130 may mark the selected AMF(s) and may not select it (them) for any other network slice(s). In an example action, the NRF 130 may maintain the context information for the isolated network slice(s), which may comprise one or more of the following information: Allowed NSSAI and/or allowed NSSAI related network slice instance(s); Network slice isolation information applied to the allowed NSSAI; Subscribed NSSAI and/or subscribed NSSAI related network slice instance(s); Network slice isolation information applied to the subscribed NSSAI; Selected AMF(s) supporting the isolated network slice(s) for the allowed NSSAI and/or the subscribed NSSAI; UE identifier(s) (e.g. SUPI and/or 5G-GUTI); PDU session ID(s); and DNN. In an example action, the NRF 130 may send to (R)AN 105 a response message (e.g. Nnrf_NFDiscovery_Response) comprising one or more of the following information: Address(es)/identifier(s) of selected AMF(s)

(e.g. IP address(es) and/or FQDN of AMF(s)); UE identifier(s) (e.g. SUPI and/or 5G-GUTI); Allowed NSSAI; Subscribed NSSAI; and DNN.

In response to the message received from the NRF 130, the (R)AN 105 may select one of AMFs (e.g. AMF 155) received from the NRF 130 and send to the AMF 155 a message (e.g. registration request) comprising the information received from the UE 100. Additionally, the (R)AN 105 may comprise one or more of the following information in the message: Allowed NSSAI and/or allowed NSSAI related network slice instance(s); Network slice isolation information applied to the allowed NSSAI; Subscribed NSSAI and/or subscribed NSSAI related network slice instance(s); Network slice isolation information applied to the subscribed NSSAI (e.g. network slice isolation type/level applied to the subscribed NSSAI and/or the subscribed NSSAI related network slice instance(s)); and Address/identifier of the selected NRF (e.g. IP address and/or FQDN of the selected NRF 130), that the selected NRF supporting the network function selection for the isolated network slice(s) of the allowed NSSAI and/or subscribed NSSAI.

In response to the message received from the (R)AN 105, the AMF 155 may store the information received from the (R)AN 105 and may continue the registration procedure. The (R)AN 105 may send to the UE 100 a registration accept message comprising one or more of the following information: Allowed NSSAI and/or allowed NSSAI related network slice instance(s); Network slice isolation information applied to the allowed NSSAI (e.g. network slice isolation type/level applied to the allowed NSSAI and/or the allowed NSSAI related network slice instance(s)); Subscribed NSSAI and/or subscribed NSSAI related network slice instance(s); Network slice isolation information applied to the subscribed NSSAI; UE identifier(s) (e.g. SUPI and/or 5G-GUTI); PDU session ID(s); and DNN.

In response to the message received from the AMF 155, the UE 100 may send to the AMF 155 a registration complete message. The UE 100 may send to the AMF 155 a NAS Message comprising at least one of: S-NSSAI, DNN, PDU Session ID, Request type, UE 5GCN Capability, or N1 SM container. The N1 SM container may comprise PDU Session Establishment Request. The UE 100 may initiate the UE requested PDU session establishment procedure by the transmission of a NAS message containing a PDU session establishment request within the N1 SM container. The PDU session establishment request may include a PDU Type (e.g. Ethernet), SSC mode, Protocol Configuration Options, and a PDU session ID generated by the UE. The S-NSSAI may be one of the allowed S-NSSAIs, and the UE may additionally comprise network slice isolation information applied to the S-NSSAI.

In response to the message received from the UE 100, the AMF 155 may select the same NRF 130 which may have been selected by the (R)AN 105, and the address of NRF 130-2 may have been received from the (R)AN 105. The AMF 155 may send to the NRF 130 a message to select an SMF for isolated network slice(s), the message may comprise one or more of the following information: Allowed NSSAI and/or allowed NSSAI related network slice instance(s); Network slice isolation information applied to the allowed NSSAI; S-NSSAI; network slice isolation information applied to the S-NSSAI; UE identifier(s) (e.g. SUPI and/or 5G-GUTI); PDU session ID; and DNN.

Based on the information received from the AMF 155 (e.g. network slice isolation information applied to the subscribed NSSAI and/or network slice isolation information applied to the S-NSSAI), the NRF 130 may take one or more actions. In an example action, the NRF 130 may determine/select SMF supporting the isolated network slice(s) for the allowed NSSAI and/or the subscribed NSSAI. For the selected SMF (e.g. SMF 160) supporting partly isolated network slice(s) with (R)AN shared and/or physically isolated network slice per PLMN and/or per allowed NSSAI and/or the subscribed NSSAI, the NRF 130 may mark the selected SMF and may not select it for any other network slice(s). In an example action, the NRF 130 may update the context information for the isolated network slice(s) by adding one or more of the following information: S-NSSAI; network slice isolation information applied to the S-NSSAI; Selected SMF supporting the isolated network slice(s) for the S-NSSAI. In an example action, the NRF 130 may send to AMF 155 a response message (e.g. Nnrf_NF-Discovery_Response) comprising one or more of the following information: Address/identifier of the selected SMF (e.g. IP address and/or FQDN of SMF 160); UE identifier(s) (e.g. SUPI and/or 5G-GUTI); PDU session ID; and DNN.

In response to the message received from the NRF 130, the AMF 155 may send to the selected SMF 160 a message (e.g. Nsmf_PDUSession_CreateSMContext request) to establish a PDU session. In response to the message received from the AMF 155, the SMF 160 may send to the AMF 155 a response message (e.g. Nsmf_PDUSession_CreateSMContext response). When the isolated network slice has been released, the AMF 155 may send to the NRF 130 a message (e.g. NF release request), the message may comprise one or more of the following information: S-NSSAI; Allowed NSSAI; Subscribed NSSAI; Address/identifier of the selected AMF (e.g. IP address and/or FQDN of AMF 155); Address/identifier of the selected SMF (e.g. IP address and/or FQDN of SMF 160); UE identifier(s) (e.g. SUPI and/or 5G-GUTI); PDU session ID; and DNN. In response to the message received from the AMF 155, the NRF 130 may release the AMF(s) and/or SMF applied to the isolated network slice(s) (e.g. release the resource and remove the mark) and may select the released AMF(s) and/or SMF using for any other network slice(s) later. The NRF 130 may send to the AMF 155 a response message (e.g. NF release response).

Example 3

As an example, a (R)AN may request from an PLMN level NRF to select an AMF for the partly isolated network slice with (R)AN and AMF shared, the NRF may provide the (R)AN a shared-slice level NRF (e.g. the NRF is configured with information belonging to a set of network slices), the (R)AN may request the shared-slice level NRF to select an AMF, and the AMF may request the shared-slice level NRF to select an SMF for the isolated network slice(s).

Figure 16:
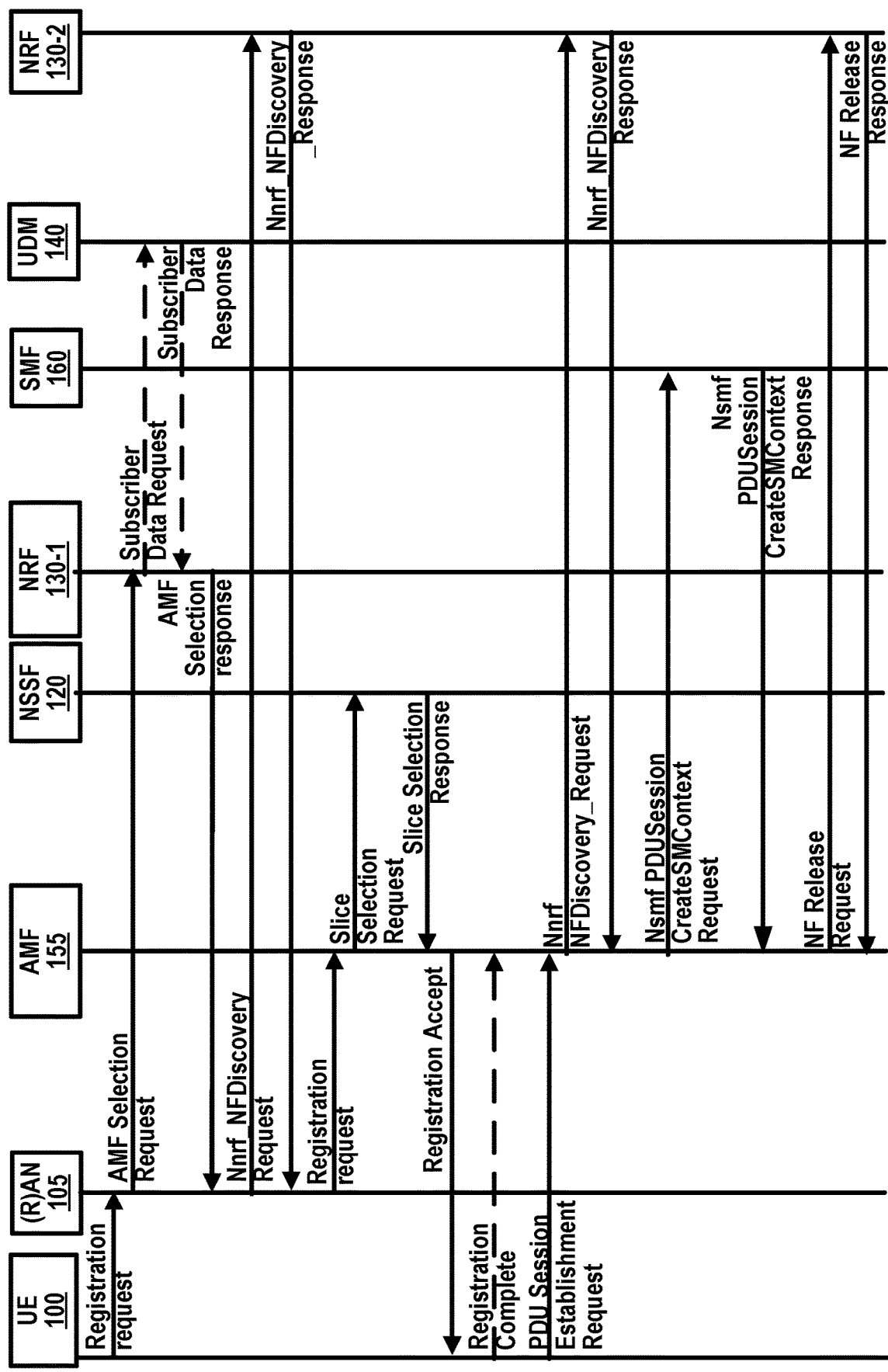
FIG. 16 is an example call flow diagram as per an aspect of an embodiment of the present disclosure.

FIG. 16 shows an example call flow which may comprise one or more actions. UE 100 may send a registration request to a (R)AN 105 comprising an AN message. The AN message may comprise AN parameters and/or a RM-NAS Registration Request, wherein the RM-NAS Registration Request may comprise at least one of: a registration type, UE identifier(s) (e.g. SUPI and/or 5G-GUTI), security parameters, a requested NSSAI, DNN, A UE 5GCN Capability, a PDU session status, PDU session(s) to be reactivated, a follow on request, or a MICO mode preference. The Requested NSSAI may comprise one or more S-NSSAIs corresponding to one or more network slices or network slice instances to which the UE may register. The DNN is the data network name, which may be equivalent to an APN the UE may access. The PDU session status and/or PDU session(s) to be re-activated may comprise the PDU session ID(s). The UE 100 may comprise the network slice isolation information in the registration request, in this example, a value of partly isolated network slice with (R)AN and AMF shared may be set by the UE 100 for the network slice isolation type (NSIT). The network slice isolation information may comprise a parameter to indicate the network slice is logically isolated or physically isolated from the one or more other network slices. In this example, logically isolated network slice indication is comprised in the network slice isolation information.

In response to the message received from the UE 100, the (R)AN 105, may send to an PLMN level NRF (e.g. NRF 130-1) a message (e.g. AMF selection request) to request an AMF for isolated network slice(s), and the message may comprise one or more of the following information received from the UE 100: Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PDU session ID(s); and DNN.

In response to the message received from the (R)AN 105, the NRF 130-1 may send the UDM 140 a message (e.g. subscriber data request) to request the subscription information of the UE 100, the message may comprise one or more of the following information: Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PDU session ID(s); and DNN.

In response to the message received from the NRF 130-1, the UDM 140 may send to the NRF 130-1 a response message (e.g. subscriber data response), and the message may comprise one or more of the following information: Subscribed NSSAI and/or subscribed NSSAI related network slice instance(s), where the subscribed NSSAI may comprise one or more S-NSSAIs corresponding to one or more network slices or network slice instances to which the UE subscribed; Network slice isolation information applied to the subscribed NSSAI (e.g. network slice isolation type/level applied to the subscribed NSSAI and/or the subscribed NSSAI related network slice instance(s)); UE identifier(s) (e.g. SUPI and/or 5G-GUTI); PDU session ID(s); and DNN.

In response to the message received from the UDM 140, the NRF 130-1 may take one or more actions. In an example action, the NRF 130-1 may determine/select NRF based on one or more of the following information: Requested NSSAI; Network slice isolation information applied to the requested NSSAI; Subscribed NSSAI and/or subscribed NSSAI related network slice instance(s); Network slice isolation information applied to the subscribed NSSAI; UE identifier(s) (e.g. SUPI and/or 5G-GUTI); DNN; local operator policies configured in NRF 130-1; and subscription information of UE configured in NRF 130-1 or received from the UDM 140. In an example, the NRF 130-1 may be the PLMN level NRF which may support the network function selection for the isolated network slice(s) per PLMN, the NRF 130-1 may select a shared-slice level NRF (e.g. NRF 130-2) which may support the network function selection for the partly isolated network slice(s) with (R)AN and AMF shared and/or logically isolated network slice(s) for the requested NSSAI and/or subscribed NSSAI. In an example action, in response to the message received from the (R)AN 105, the NRF 130-1 may send to the (R)AN 105 a response message (e.g. AMF selection response) comprising one or more of the following information: Subscribed NSSAI and/or subscribed NSSAI related network slice instance(s); Network slice isolation information applied to the subscribed NSSAI (e.g. network slice isolation type/level applied to the subscribed NSSAI and/or the subscribed NSSAI related network slice instance(s)); Address/identifier of the selected NRF (e.g. IP address and/or FQDN of NRF 130-2), that the NRF may support the network function selection for the isolated network slice(s) of the requested NSSAI and/or subscribed NSSAI; UE identifier(s) (e.g. SUPI and/or 5G-GUTI); PDU session ID(s); and DNN.

In response to the message received from the NRF 130-1, the (R)AN 105 may select the received NRF 130-2 and send to the NRF 130-2 a message (e.g. Nnrf_NFDiscovery_Request) to select an AMF serving the isolated network slice(s). The message may comprise one or more of the following information: Requested NSSAI; Network slice isolation information applied to the requested NSSAI; Subscribed NSSAI and/or subscribed NSSAI related network slice instance(s); Network slice isolation information applied to the subscribed NSSAI; UE identifier(s) (e.g. SUPI and/or 5G-GUTI); PDU session ID(s); and DNN.

Based on the information received from the (R)AN 105 (e.g. network slice isolation information applied to the subscribed NSSAI), the NRF 130-2 may take one or more actions. In an example action, the NRF 130-2 may determine/select AMF(s) supporting the isolated network slice(s) for the requested NSSAI and/or the subscribed NSSAI. For the selected AMF(s) supporting partly isolated network slice(s) with (R)AN and AMF shared and/or logically isolated network slice(s) per PLMN and/or per requested NSSAI and/or subscribed NSSAI, the NRF 130-2 may mark the selected AMF(s) and may select it (them) for any other network slice(s) later. The NRF 130-2 may send the selected AMF(s) to the NRF 130-1 to ensure the selected AMF(s) are available per PLMN (e.g. not used by any other isolated network slice(s)). In an example, the NRF 130-1 may return a success cause, which may indicate that the AMF(s) selected by the NRF 130-2 have not been used by any other network slice(s). In an example, the NRF 130-1 may return a failure cause, which may indicate that AMF(s) selected by the NRF 130-2 may have been used by any other network slice(s), and the NRF 130-1 may return the available AMF(s). The NRF 130-2 may take the returned AMF(s) as the selected AMF(s). In an example action, the NRF 130-2 may maintain the context information for the isolated network slice(s), which may comprise one or more of the following information: Requested NSSAI; Network slice isolation information applied to the requested NSSAI; Subscribed NSSAI and/or subscribed NSSAI related network slice instance(s); Network slice isolation information applied to the subscribed NSSAI; Selected AMF(s) supporting the isolated network slice(s) for the requested NSSAI and/or the subscribed NSSAI; UE identifier(s) (e.g. SUPI and/or 5G-GUTI); PDU session ID(s); and DNN. In an example action, the NRF 130-2 may send to (R)AN 105 a response message (e.g. Nnrf_NFDiscovery_Response) comprising one or more of the following information: Address (es)/Identifier(s) of the selected AMF(s) (e.g. IP address(es) and/or FQDN of AMF(s)); UE identifier(s) (e.g. SUPI and/or 5G-GUTI); requested NSSAI; Subscribed NSSAI; and DNN.

In response to the message received from the NRF 130-2, the (R)AN 105 may select one of AMFs (e.g. AMF 155) received from the NRF 130-2 and send to the AMF 155 a message (e.g. registration request) comprising the information received from the UE 100. Additionally, the (R)AN 105 may comprise one or more of the following information in the message: Subscribed NSSAI and/or subscribed NSSAI related network slice instance(s); Network slice isolation information applied to the subscribed NSSAI (e.g. network slice isolation type/level applied to the subscribed NSSAI and/or the subscribed NSSAI related network slice instance(s)); and Address/identifier of the selected NRF (e.g. IP address and/or FQDN of NRF 130-2) that the selected NRF may support the network function selection for the isolated network slice(s) of the requested NSSAI and/or subscribed NSSAI.

In response to the message received from the (R)AN 105, the AMF 155 may send to the NSSF 120 a message (e.g. slice selection request) (e.g. slice selection request) to request allowed NSSAI and/or allowed NSSAI related network slice instance(s), and the message may comprise one or more of the following information received from the UE 100: Requested NSSAI; Network slice isolation information applied to the requested NSSAI (e.g. network slice isolation type/level applied to the requested NSSAI and/or the requested NSSAI related network slice instance(s)); Subscribed NSSAI and/or subscribed NSSAI related network slice instance(s); Network slice isolation information applied to the subscribed NSSAI (e.g. network slice isolation type/level applied to the subscribed NSSAI and/or the subscribed NSSAI related network slice instance(s)); UE identifier(s) (e.g. SUPI and/or 5G-GUTI); PDU session ID(s); and DNN.

In response to the message received from the AMF 155, the NSSF 120 may take one or more actions. In an example action, the NSSF 120 may determine allowed NSSAI and/or allowed NSSAI related network slice instance(s). The NSSF 120 may determine/create the allowed NSSAI and/or allowed NSSAI related network slice instance(s) based on one or more of the following information: Requested NSSAI; Network slice isolation information applied to the requested NSSAI; Subscribed NSSAI and/or subscribed NSSAI related network slice instance(s); Network slice isolation information applied to the subscribed NSSAI; UE identifier(s) (e.g. SUPI and/or 5G-GUTI); DNN; local operator policies configured in NSSF 120; and subscription information of UE configured in NSSF 120 or received from the UDM 140. The allowed NSSAI may comprise one or more S-NSSAIs corresponding to one or more network slices or network slice instances to which the UE 100 is allowed to access. The NSSF may determine the network slice isolation information applied to the allowed NSSAI and/or the allowed NSSAI related network slice instance(s)). In an example action, in response to the message received from the AMF 155, the NSSF 120 may send to the AMF 155 a response message (e.g. slice selection response) comprising one or more of the following information: Allowed NSSAI and/or allowed NSSAI related network slice instance(s); Network slice isolation information applied to the allowed NSSAI (e.g. network slice isolation type/level applied to the allowed NSSAI and/or the allowed NSSAI related network slice instance(s)); UE identifier(s) (e.g. SUPI and/or 5G-GUTI); PDU session ID(s); DNN.

In response to the message received from the NSSF 120, the AMF 155 may store the information received from the NSSF 120 and may continue the registration procedure. The (R)AN 105 may send to the UE 100 a registration accept message comprising one or more of the following information: Allowed NSSAI and/or allowed NSSAI related network slice instance(s); Network slice isolation information applied to the allowed NSSAI (e.g. network slice isolation type/level applied to the allowed NSSAI and/or the allowed NSSAI related network slice instance(s)); Subscribed NSSAI and/or subscribed NSSAI related network slice instance(s); Network slice isolation information applied to the subscribed NSSAI; UE identifier(s) (e.g. SUPI and/or 5G-GUTI); PDU session ID(s); and DNN.

In response to the message received from the AMF 155, the UE 100 may send to the AMF 155 a registration complete message. The UE 100 may send to the AMF 155 a NAS Message comprising at least one of: S-NSSAI, DNN, PDU Session ID, Request type, UE 5GCN Capability, or N1 SM container. The N1 SM container may comprise PDU Session Establishment Request. The UE 100 may initiate the UE requested PDU session establishment procedure by the transmission of a NAS message containing a PDU session establishment request within the N1 SM container. The PDU session establishment request may include a PDU Type (e.g. Ethernet), SSC mode, Protocol Configuration Options, and a PDU session ID generated by the UE. The S-NSSAI may be one of the allowed S-NSSAIs, and the UE may additionally comprise network slice isolation information applied to the S-NSSAI.

In response to the message received from the UE 100, the AMF 155 may select the same NRF 130-2 which may have been selected by the (R)AN 105, and the address of NRF 130-2 may have been received from the (R)AN 105. The AMF 155 may send to the NRF 130-2 a message to select an SMF for isolated network slice(s), the message may comprise one or more of the following information: Requested NSSAI; Network slice isolation information applied to the requested NSSAI; Allowed NSSAI and/or allowed NSSAI related network slice instance(s); Network slice isolation information applied to the allowed NSSAI; Subscribed NSSAI and/or subscribed NSSAI related network slice instance(s); Network slice isolation information applied to the subscribed NSSAI; S-NSSAI; network slice isolation information applied to the S-NSSAI; UE identifier(s) (e.g. SUPI and/or 5G-GUTI); PDU session ID; and DNN.

Based on the information received from the AMF 155 (e.g. network slice isolation information applied to the subscribed NSSAI and/or network slice isolation information applied to the S-NSSAI), the NRF 130-2 may take one or more actions. In an example action, the NRF 130-2 may determine/select SMF supporting the isolated network slice(s) for the allowed NSSAI and/or the subscribed NSSAI. For the selected SMF (e.g. SMF 160) supporting partly isolated network slice(s) with (R)AN and AMF shared and/or logically isolated network slice per PLMN and/or per allowed NSSAI and/or the subscribed NSSAI, the NRF 130-2 may mark the selected SMF and may not select it for any other network slice(s). The NRF 130-2 may send the selected SMF to the NRF 130-1 to ensure the selected SMF are available per PLMN (e.g. not used by any other isolated network slice(s)). In an example, the NRF 130-1 may return a success cause, which may indicate that the SMF selected by the NRF 130-2 have not been used by any other network slice(s). In an example, the NRF 130-1 may return a failure cause, which may indicate that SMF selected by the NRF 130-2 may have been used by any other network slice(s), and the NRF 130-1 may return the available SMF. The NRF 130-2 may take the returned SMF as the selected SMF. In an example action, the NRF 130-2 may update the context information for the isolated network slice(s) by adding one or more of the following information: Requested NSSAI; Network slice isolation information applied to the requested NSSAI; Allowed NSSAI and/or allowed NSSAI related network slice instance(s); Network slice isolation information applied to the allowed NSSAI; S-NSSAI; network slice isolation information applied to the S-NSSAI; and Selected SMF supporting the isolated network slice(s) for the S-NSSAI. In an example action, the NRF 130-2 may send to AMF 155 a response message (e.g. Nnrf_NFDiscovery_Response) comprising one or more of the following information: Address/identifier of the selected SMF (e.g. IP address and/or FQDN of SMF 160); UE identifier(s) (e.g. SUPI and/or 5G-GUTI); PDU session ID; and DNN.

In response to the message received from the NRF 130-2, the AMF 155 may send to the selected SMF 160 a message (e.g. Nsmf_PDUSession_CreateSMContext request) to establish a PDU session. In response to the message received from the AMF 155, the SMF 160 may send to the AMF 155 a response message (e.g. Nsmf_PDUSession_CreateSMContext response). When the isolated network slice has been released, the AMF 155 may send to the NRF 130-2 a message (e.g. NF release request), the message may comprise one or more of the following information: S-NSSAI; Allowed NSSAI; Subscribed NSSAI; Address/identifier of the AMF (e.g. IP address and/or FQDN of AMF 155), that the AMF may have supported the isolated network slice(s) for the allowed NSSAI and/or the subscribed NSSAI; Address/identifier of the SMF (e.g. IP address and/or FQDN of SMF 160) that the AMF may have supported the isolated network slice(s) for the S-NSSAI (e.g. allowed S-NSSAI); UE identifier(s) (e.g. SUPI and/or 5G-GUTI); PDU session ID; and DNN.

In response to the message received from the AMF 155, the NRF 130-2 may release the AMF(s) and/or SMF applied to the isolated network slice(s) and may select the released AMF(s) and/or SMF using for any other network slice(s) later. The NRF 130-2 may send to the AMF 155 a response message (e.g. NF release response). The NRF 130-2 may send a message to the NRF 130-1 to indicate the released AMF(s) and/or SMF. As another example, the AMF 155 may send to the NRF 130-1 a message to release the AMF(s) and/or SMF, and the NRF 130-1 may send to the NRF 130-2 to release the AMF(s) and/or SMF.

Example 4

As an example, a (R)AN may request from an PLMN level NRF to select an AMF for the partly isolated network slice with (R)AN and AMF shared, the NRF PLMN level NRF may forward the request to a shared-slice level NRF (e.g. the NRF is configured with information belonging to a set of network slices), the shared-slice level NRF may select an AMF and provide the selected AMF to (R)AN through the PLMN level NRF. The AMF selected may request the shared-slice level NRF to select an SMF for the isolated network slice(s).

Figure 17:
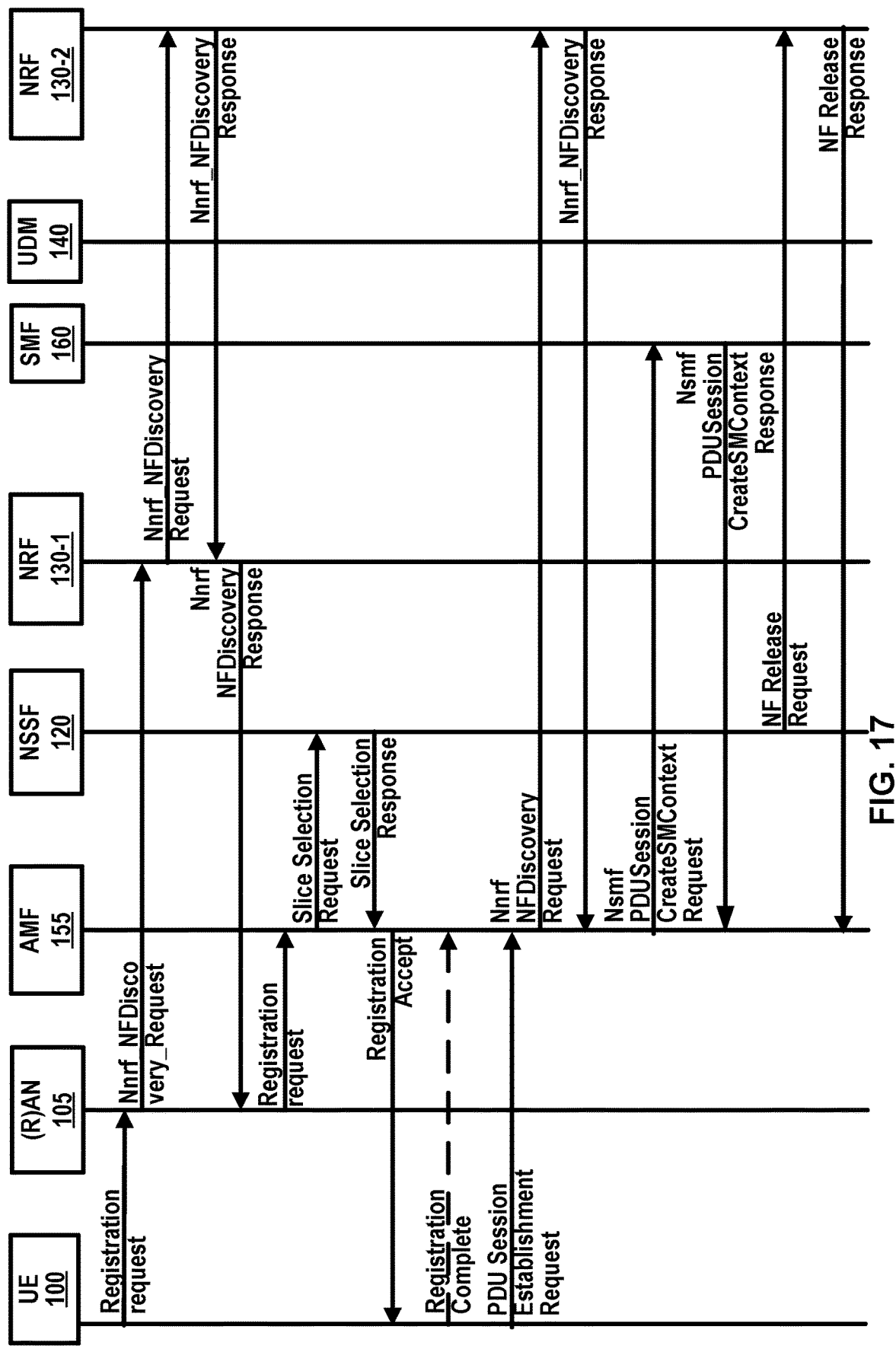
FIG. 17 is an example call flow diagram as per an aspect of an embodiment of the present disclosure.

FIG. 17 shows an example call flow which may comprise one or more actions. UE 100 may send a registration request to a (R)AN 105 comprising an AN message. The AN message may comprise AN parameters and/or a RM-NAS Registration Request, wherein the RM-NAS Registration Request may comprise at least one of: a registration type, UE identifier(s) (e.g. SUPI and/or 5G-GUTI), security parameters, a requested NSSAI, DNN, A UE 5GCN Capability, a PDU session status, PDU session(s) to be re-activated, a follow on request, or a MICO mode preference. The Requested NSSAI may comprise one or more S-NSSAIs corresponding to one or more network slices or network slice instances to which the UE may register. The DNN is the data network name, which may be equivalent to an APN the UE may access. The PDU session status and/or PDU session(s) to be re-activated may comprise the PDU session ID(s). The UE 100 may comprise the network slice isolation information in the registration request, in this example, a value of partly isolated network slice with (R)AN and AMF shared may be set by the UE 100 for the network slice isolation type (NSIT). The network slice isolation information may comprise a parameter to indicate the network slice is logically isolated or physically isolated from the one or more other network slices. In this example, logically isolated network slice indication is comprised in the network slice isolation information.

In response to the message received from the UE 100, the (R)AN 105, may send to an PLMN level NRF (e.g. NRF 130-1) a message (e.g. Nnrf_NFDiscovery_Request) to request an AMF for isolated network slice(s), and the message may comprise one or more of the following information received from the UE 100: Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PDU session ID(s); and DNN.

In response to the message received from the (R)AN 105, the NRF 130-1 may take one or more actions. In an example, the NRF 130-1 may determine/select NRF based on one or more of the following information: Requested NSSAI; Network slice isolation information applied to the requested NSSAI; UE identifier(s) (e.g. SUPI and/or 5G-GUTI); DNN; local operator policies configured in NRF 130-1; and subscription information of UE configured in NRF 130-1 or received from the UDM 140. In an example, the PLMN level NRF 130-1 may select a shared-slice level NRF (e.g. NRF 130-2) which may support the network function selection for the partly isolated network slice(s) with (R)AN and AMF shared and/or logically isolated network slice(s) for the requested NSSAI and/or subscribed NSSAI. In an example, the NRF 130-1 may send to the NRF 130-2 a message (e.g. Nnrf_NFDiscovery_Request) to request an AMF for isolated network slice(s), and the message may comprise one or more of the following information: Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PDU session ID(s); and DNN.

Based on the information received from the NRF 130-1 (e.g. network slice isolation information applied to the requested NSSAI), the NRF 130-2 may take one or more actions. In an example action, the NRF 130-2 may determine/select AMF(s) supporting the isolated network slice(s) for the requested NSSAI. For the selected AMF(s) supporting partly isolated network slice(s) with (R)AN and AMF shared and/or logically isolated network slice(s) per PLMN and/or per requested NSSAI and/or subscribed NSSAI, the NRF 130-2 may mark the selected AMF(s) and may select it (them) for any other network slice(s) later. In an example action, the NRF 130-2 may maintain the context information for the isolated network slice(s), which may comprise one or more of the following information: Requested NSSAI; Network slice isolation information applied to the requested NSSAI; Selected AMF(s) supporting the isolated network slice(s) for the requested NSSAI; UE identifier(s) (e.g. SUPI and/or 5G-GUTI); PDU session ID(s); and DNN. In an example action, the NRF 130-2 may send to NRF 130-1 a response message (e.g. Nnrf_NFDiscovery_Response) comprising one or more of the following information: Address(es)/Identifier(s) of the selected AMF(s) (e.g. IP address(es) and/or FQDN of AMF(s)); UE identifier(s) (e.g. SUPI and/or 5G-GUTI); requested NSSAI; and DNN.

In response to the message received from the NRF 130-2, the NRF 130-1 may take one or more of actions. In an example action, the NRF 130-1 may ensure the selected AMF(s) are available (e.g. not used by any other isolated network slice(s)) per PLMN. In an example, the NRF 130-1 may accept the AMF(s) selected by the NRF 130-2. In an example, the NRF 130-1 may return a failure cause to the NRF 130-2, which may indicate that AMF(s) selected by the NRF 130-2 may have been used by any other network slice(s), and the NRF 130-1 may return to the NRF 130-2 the available AMF(s). The NRF 130-2 may take the returned AMF(s) as the selected AMF(s). In an example action, the NRF 130-1 may send to the (R)AN 105 a response message (e.g. Nnrf_NFDiscovery_Response) comprising one or more of the following information: Address(es)/Identifier(s) of the selected AMF(s) (e.g. IP address(es) and/or FQDN of AMF(s)); Address/identifier of the selected NRF (e.g. IP address and/or FQDN of NRF 130-2); UE identifier(s) (e.g. SUPI and/or 5G-GUTI); requested NSSAI; and DNN.

In response to the message received from the NRF 130-1, the (R)AN 105 may select one of AMFs (e.g. AMF 155) received from the NRF 130-1 and send to the AMF 155 a message (e.g. registration request) comprising the information received from the UE 100. Additionally, the (R)AN 105 may comprise Address/identifier of the selected NRF (e.g. IP address and/or FQDN of NRF 130-2) in the message. The selected NRF may support the network function selection for the isolated network slice(s) of the requested NSSAI.

In response to the message received from the (R)AN 105, the AMF 155 may send to the NSSF 120 a message (e.g. slice selection request) (e.g. slice selection request) to request allowed NSSAI and/or allowed NSSAI related network slice instance(s), and the message may comprise one or more of the following information received from the UE 100: Requested NSSAI; Network slice isolation information applied to the requested NSSAI (e.g. network slice isolation type/level applied to the requested NSSAI and/or the requested NSSAI related network slice instance(s)); UE identifier(s) (e.g. SUPI and/or 5G-GUTI); PDU session ID(s); and DNN.

In response to the message received from the AMF 155, the NSSF 120 may take one or more actions. In an example action, the NSSF 120 may determine allowed NSSAI and/or allowed NSSAI related network slice instance(s). The NSSF 120 may determine/create the allowed NSSAI and/or allowed NSSAI related network slice instance(s) based on one or more of the following information: Requested NSSAI; Network slice isolation information applied to the requested NSSAI; Subscribed NSSAI and/or subscribed NSSAI related network slice instance(s) (e.g. get from a UDM 140); Network slice isolation information applied to the subscribed NSSAI (e.g. get from a UDM 140); UE identifier(s) (e.g. SUPI and/or 5G-GUTI); DNN; local operator policies configured in NSSF 120; and subscription information of UE configured in NSSF 120 or received from the UDM 140. The allowed NSSAI may comprise one or more S-NSSAIs corresponding to one or more network slices or network slice instances to which the UE 100 is allowed to access. The NSSF may determine the network slice isolation information applied to the allowed NSSAI and/or the allowed NSSAI related network slice instance(s). In an example action, in response to the message received from the AMF 155, the NSSF 120 may send to the AMF 155 a response message (e.g. slice selection response) comprising one or more of the following information: Allowed NSSAI and/or allowed NSSAI related network slice instance(s); Network slice isolation information applied to the allowed NSSAI (e.g. network slice isolation type/level applied to the allowed NSSAI and/or the allowed NSSAI related network slice instance(s)); UE identifier(s) (e.g. SUPI and/or 5G-GUTI); PDU session ID(s); and DNN.

In response to the message received from the NSSF 120, the AMF 155 may store the information received from the NSSF 120 and may continue the registration procedure. The (R)AN 105 may send to the UE 100 a registration accept message comprising one or more of the following information: Allowed NSSAI and/or allowed NSSAI related network slice instance(s); Network slice isolation information applied to the allowed NSSAI (e.g. network slice isolation type/level applied to the allowed NSSAI and/or the allowed NSSAI related network slice instance(s)); UE identifier(s) (e.g. SUPI and/or 5G-GUTI); PDU session ID(s); and DNN.

In response to the message received from the AMF 155, the UE 100 may send to the AMF 155 a registration complete message. The UE 100 may send to the AMF 155 a NAS Message comprising at least one of: S-NSSAI, DNN, PDU Session ID, Request type, UE 5GCN Capability, or N1 SM container. The N1 SM container may comprise PDU Session Establishment Request. The UE 100 may initiate the UE requested PDU session establishment procedure by the transmission of a NAS message containing a PDU session establishment request within the N1 SM container. The PDU session establishment request may include a PDU Type (e.g. Ethernet), SSC mode, Protocol Configuration Options, and a PDU session ID generated by the UE. The S-NSSAI may be one of the allowed S-NSSAIs, and the UE may additionally comprise network slice isolation information applied to the S-NSSAI.

In response to the message received from the UE 100, the AMF 155 may select the same NRF 130-2 which address may have been received from the (R)AN 105. The AMF 155 may send to the NRF 130-2 a message to select an SMF for isolated network slice(s), the message may comprise one or more of the following information: Requested NSSAI; Network slice isolation information applied to the requested NSSAI; Allowed NSSAI and/or allowed NSSAI related network slice instance(s); Network slice isolation information applied to the allowed NSSAI; S-NSSAI; network slice isolation information applied to the S-NSSAI; UE identifier(s) (e.g. SUPI and/or 5G-GUTI); PDU session ID; and DNN.

Based on the information received from the AMF 155 (e.g. network slice isolation information applied to the allowed NSSAI and/or network slice isolation information applied to the S-NSSAI), the NRF 130-2 may take one or more actions. In an example action, the NRF 130-2 may determine/select SMF supporting the isolated network slice(s) for the allowed NSSAI and/or the S-NSSAI. For the selected SMF (e.g. SMF 160) supporting partly isolated network slice(s) with (R)AN and AMF shared and/or logically isolated network slice per PLMN and/or per allowed NSSAI and/or the S-NSSAI, the NRF 130-2 may mark the selected SMF and may not select it for any other network slice(s). The NRF 130-2 may send the selected SMF to the NRF 130-1 to ensure the selected SMF are available per PLMN (e.g. not used by any other isolated network slice(s)). In an example, the NRF 130-1 may return a success cause, which may indicate that the SMF selected by the NRF 130-2 have not been used by any other network slice(s). In an example, the NRF 130-1 may return a failure cause, which may indicate that SMF selected by the NRF 130-2 may have been used by any other network slice(s), and the NRF 130-1 may return the available SMF. The NRF 130-2 may take the returned SMF as the selected SMF. In an example action, the NRF 130-2 may update the context information for the isolated network slice(s) by adding one or more of the following information: Allowed NSSAI and/or allowed NSSAI related network slice instance(s); Network slice isolation information applied to the allowed NSSAI; S-NS-SAI; Network slice isolation information applied to the S-NSSAI; and Selected SMF supporting the isolated network slice(s) for the S-NSSAI. In an example action, the NRF 130-2 may send to AMF 155 a response message (e.g. Nnrf_NFDiscovery_Response) comprising one or more of the following information: Address/identifier of the selected SMF (e.g. IP address and/or FQDN of SMF 160), that the SMF may support the isolated network slice(s) for the S-NSSAI; UE identifier(s) (e.g. SUPI and/or 5G-GUTI); PDU session ID; and DNN.

In response to the message received from the NRF 130-2, the AMF 155 may send to the selected SMF 160 a message (e.g. Nsmf_PDUSession_CreateSMContext request) to establish a PDU session. In response to the message received from the AMF 155, the SMF 160 may send to the AMF 155 a response message (e.g. Nsmf_PDUSession_CreateSMContext response). When the isolated network slice has been released, the AMF 155 may send to the NRF 130-2 a message (e.g. NF release request), the message may comprise one or more of the following information: S-NSSAI; Allowed NSSAI; Address/identifier of the AMF (e.g. IP address and/or FQDN of AMF 155), that the AMF may support the isolated network slice(s) for the requested NSSAI; Address/identifier of the SMF (e.g. IP address and/or FQDN of SMF 160) that the SMF may support the isolated network slice(s) for the S-NSSAI (e.g. allowed S-NSSAI); UE identifier(s) (e.g. SUPI and/or 5G-GUTI); PDU session ID; and DNN.

In response to the message received from the AMF 155, the NRF 130-2 may release the AMF(s) and/or SMF applied to the isolated network slice(s) and may select the released AMF(s) and/or SMF using for any other network slice(s) later. The NRF 130-2 may send to the AMF 155 a response message (e.g. NF release response). The NRF 130-2 may send a message to the NRF 130-1 to indicate the released AMF(s) and/or SMF.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

Figure 23:
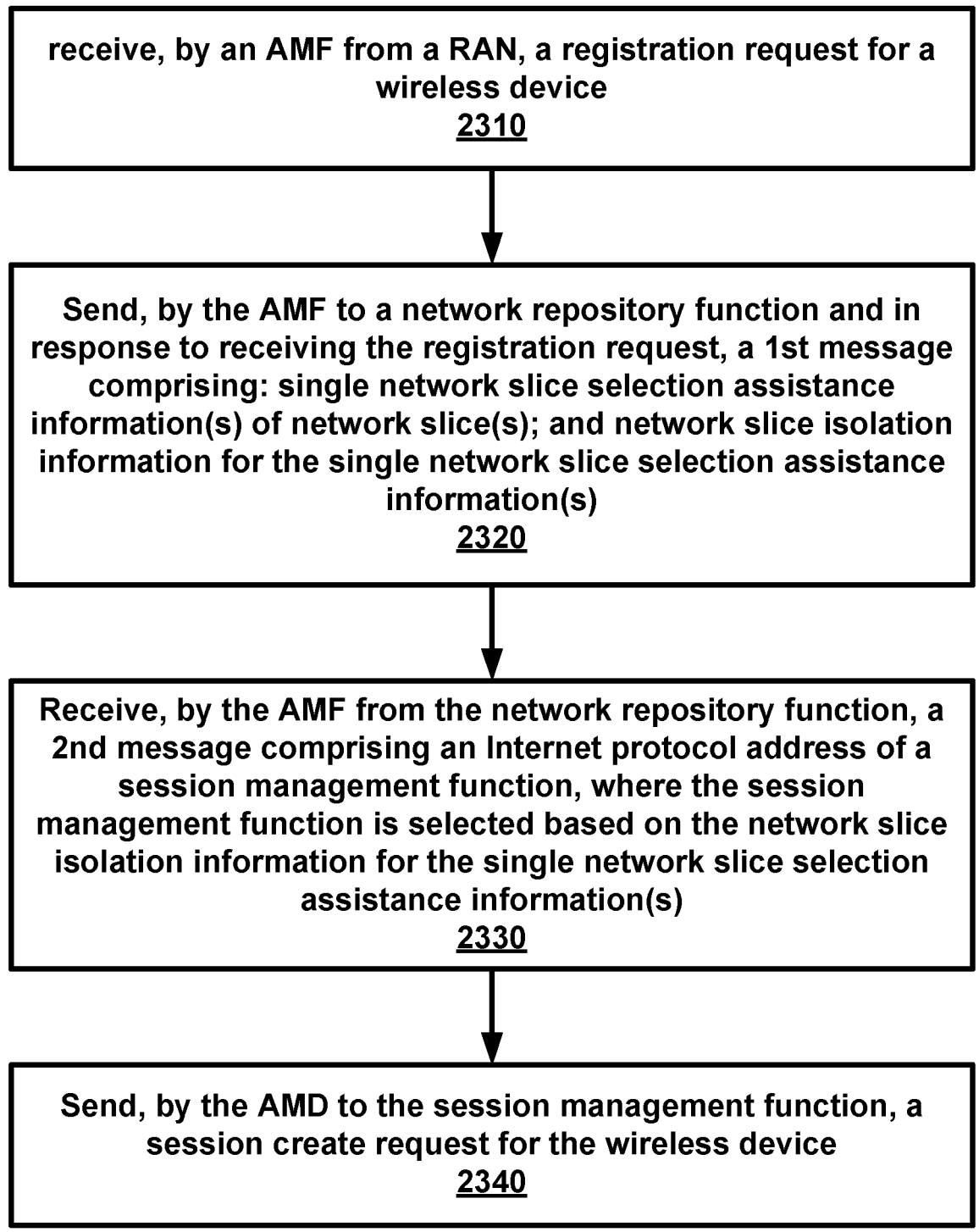
FIG. 23 is a flow diagram of an aspect of an embodiment of the present disclosure.

FIG. 23 is a flow diagram of an aspect of an embodiment of the present disclosure. At 2310, an access and mobility management function may receive a registration request from a radio access network. The registration request may be for a wireless device. At 2320, the access and mobility management function may send first message to a network repository function in response to receiving the registration request. The first message may comprise at least one single network slice selection assistance information of at least one network slice. The first message may comprise network slice isolation information for the at least one single network slice selection assistance information. At 2330, the access and mobility management function may receive a second message from the network repository function. The second message may comprise an Internet protocol address of a session management function. The session management function may be selected based on the network slice isolation information for the at least one single network slice selection assistance information. At 2340, the access and mobility management function may send a session create request to the session management function. The session create request may be for the wireless device.

According to an example embodiment, the second message may further comprise a fully qualified domain name of the session management function. According to an example embodiment, the first message may comprise a user identity of a wireless device. According to an example embodiment, the first message may comprise at least one data network name. According to an example embodiment, a single network slice selection assistance information of the at least one single network slice selection assistance information may comprise one of a subscription single network slice selection assistance information or an allowed single network slice selection assistance information.

According to an example embodiment, the access and mobility management function may receive a third message from a wireless device. The third message may request to establish a packet data unit session. The third message may comprise an allowed single network slice selection assistance information. The third message may comprise a network slice isolation information applied to the allowed single network slice selection assistance information. According to an example embodiment, the network repository function may receive a fourth message from the access and mobility management function. The fourth message may request release of the session management function. The fourth message may comprise an address of the session management function. The fourth message may comprise an identifier of the session management function. The fourth message may comprise a user identity of the wireless device.

According to an example embodiment, the network slice isolation information may comprise a first indicator to indicate a network slice of the at least one network slice is isolated from one or more other network slices. According to an example embodiment, the network slice isolation information may comprise a network slice isolation level to indicate a level of the at least one network slice is isolated from one or more other network slices.

According to an example embodiment, the level of the at least one network slice may be isolated from one or more other network slices comprises a fully isolated network slice. According to an example embodiment, the fully isolated network slice may be a network slice instance that does not share neither the radio access network nor a core network function with any other network slice instance. According to an example embodiment, the level at which the at least one network slice is isolated from the one or more other network slices may comprise a partly isolated network slice with sharing of the radio access network. According to an example embodiment, the partly isolated network slice with radio access network shared is the radio access network belonging to an isolated network slice instance comprising a network function that can be seen from outside of the isolated network slice instance. According to an example embodiment, the level of the at least one network slice is isolated from one or more other network slices may comprise a partly isolated network slice with radio access network and access and mobility management function shared. According to an example embodiment, the partly isolated network slice with radio access network and access and mobility management function shared may comprise both the radio access network and access and mobility management function belonging to an isolated network slice instance that can be seen from the outside of the isolated network slice instance. According to an example embodiment, the network slice may be isolated from one or more other network slices when the network slice is fully isolated or partly isolated from the one or more other network slices. According to an example embodiment, the network slice may be isolated from one or more other network slices when the network slice is logically isolated or physically isolated from the one or more other network slices.

According to an example embodiment, the selecting the access and mobility management function, by the network repository function may be further based on the at least one single network slice selection assistance information. According to an example embodiment, the selecting the access and mobility management function, by the network repository function may be further based on at least one data network name. According to an example embodiment, the selecting the access and mobility management function, by the network repository function may be further based on a user identity. According to an example embodiment, the selecting the access and mobility management function, by the network repository function may be further based on the network slice isolation information comprises a network slice instance identifier of the network slice.

FIG. 24 is a flow diagram of an aspect of an embodiment of the present disclosure. At 2410, a network repository function may receive a first message from an access and mobility management function. The first message may indicate a request to select a session management function. The first message may comprise at least one single network slice selection assistance information of at least one network slice. The first message may comprise network slice isolation information of the at least one single network slice selection assistance information. At 2420, the network repository function may select the session management function based on the network slice isolation information for the at least one single network slice selection assistance information. At 2430, the network repository function may send a second message to the access and mobility management function. The second message may comprise an Internet protocol address of the session management function.

Figure 25:
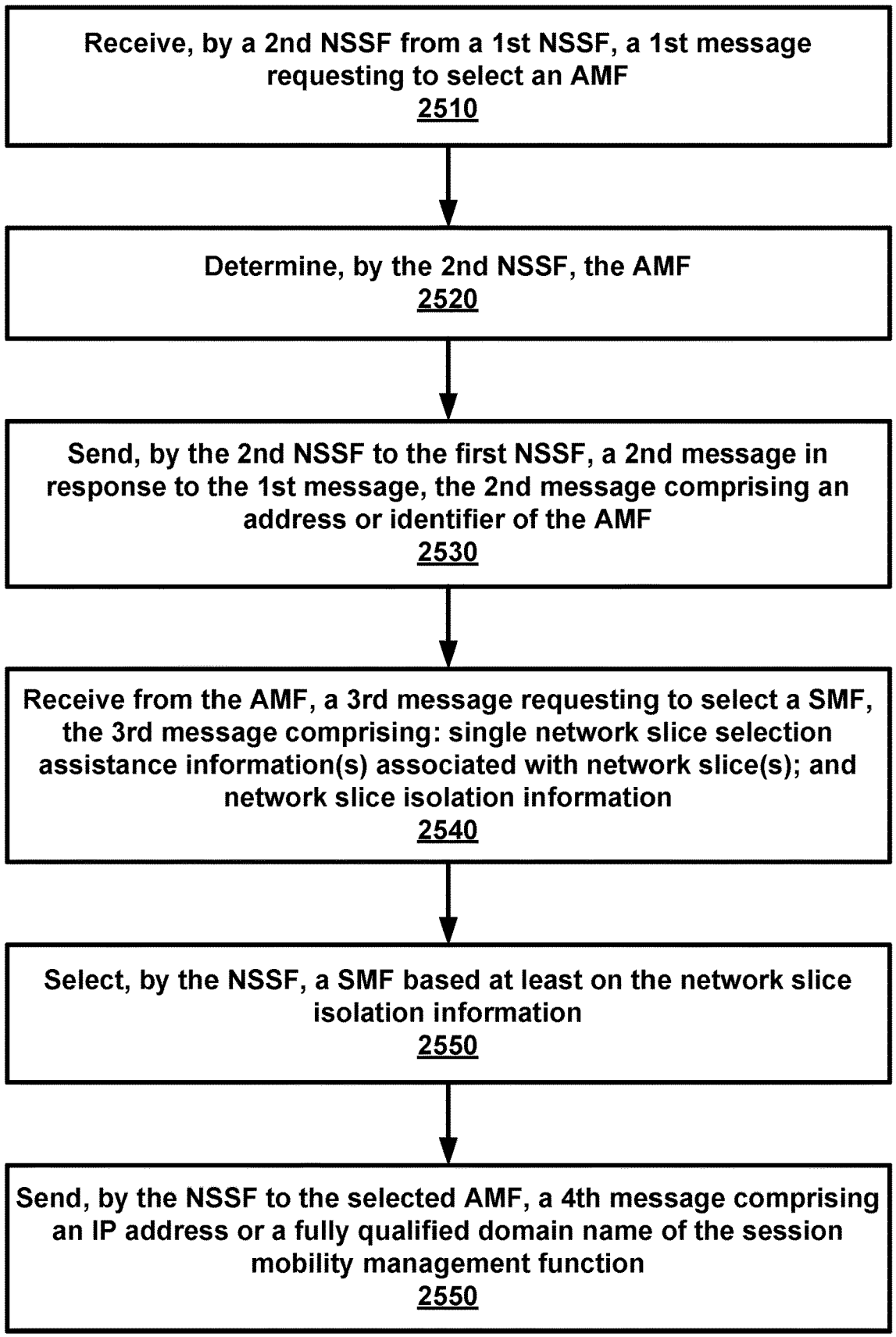
FIG. 25 is a flow diagram of an aspect of an embodiment of the present disclosure.

FIG. 25 is a flow diagram of an aspect of an embodiment of the present disclosure. At 2510, a second network slice selection function may receive a first message from a first network slice selection function. The first message may request a selection of an access and mobility management function. At 2520, the second network slice selection function may determine the access and mobility management function. At 2530, the second network slice selection function may send a second message to the first network slice selection function in response to the first message. The second message may comprise an address or identifier of the access and mobility management function. At 2540, the access and mobility management function may receive a third message requesting to select a session management function. The third message may comprise at least one single network slice selection assistance information associated with at least one network slice. The third message may comprise network slice isolation information. At 2550, selecting, by the network slice selection function, a session management function based at least on the network slice isolation information. At 2560, the network slice selection function may send a fourth message to the selected access and mobility management function. The fourth message may comprise an IP address or a fully qualified domain name of the session mobility management function.

According to an example embodiment, the requesting to select the access and mobility management function may be for at least one isolated network slice. According to an example embodiment, the first message may comprise a user identity. According to an example embodiment, the first message may comprise a requested network slice selection assistance information. The requested network slice selection assistance information may be applied to the requested network slice selection assistance information. According to an example embodiment, the first message may comprise network slice isolation information. The network slice isolation information may be applied to the requested network slice selection assistance information. According to an example embodiment, the determining of the access and mobility management function may be based on the information received from the first message. In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some Examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    receiving, by an access and mobility management function from a radio access network, a registration request for a wireless device;
    sending, by the access and mobility management function to a network repository function and in response to receiving the registration request, a discovery request message requesting an Internet protocol address of a session management function comprising:
        at least one single network slice selection assistance information of at least one network slice; and
        network slice isolation information for the at least one single network slice selection assistance information;
    receiving, by the access and mobility management function from the network repository function and in response to the discovery request message, a discovery response message comprising the Internet protocol address of the session management function; and
    sending, by the access and mobility management function to the session management function, a session create request to create a session for the wireless device.

2. The method of claim 1, wherein the discovery response message further comprises a fully qualified domain name of the session management function.

3. The method of claim 1, wherein the discovery request message comprises a user identity of a wireless device.

4. The method of claim 1, wherein the discovery request message comprises at least one data network name.

5. The method of claim 1, wherein a single network slice selection assistance information of the at least one single network slice selection assistance information is one of a subscription single network slice selection assistance information, or allowed single network slice selection assistance information.

6. The method of claim 1, further comprising receiving, by the access and mobility management function from a wireless device, a third message requesting to establish a packet data unit session, wherein the third message comprising an allowed single network slice selection assistance information.

7. The method of claim 6, wherein the third message comprises a network slice isolation information applied to the allowed single network slice selection assistance information.

8. The method of claim 1, further comprising receiving, by the network repository function from the access and mobility management function, a fourth message requesting to release the session management function, wherein the fourth message comprises at least one of:
    an address of the session management function;
    an identifier of the session management function; or
    a user identity of the wireless device.

9. The method of claim 1, wherein the network slice isolation information comprises a first indicator to indicate a network slice of the at least one network slice is isolated from one or more other network slices.

10. The method of claim 1, wherein the network slice isolation information comprises a network slice isolation level to indicate a level of the at least one network slice is isolated from one or more other network slices.

11. The method of claim 10, wherein the level of the at least one network slice is isolated from the one or more other network slices comprises a fully isolated network slice.

12. The method of claim 11, wherein the fully isolated network slice is network slice instance does not share neither the radio access network nor a core network function with any other network slice instance.

13. The method of claim 10, wherein the level at which the at least one network slice is isolated from the one or more other network slices comprises a partly isolated network slice with sharing of the radio access network.

14. The method of claim 13, wherein the partly isolated network slice with radio access network shared is the radio access network belonging to an isolated network slice instance is a network function that can be seen from outside of the isolated network slice instance.

15. The method of claim 10, wherein the level of the at least one network slice is isolated from the one or more other network slices comprises a partly isolated network slice with radio access network and access and mobility management function shared.

16. The method of claim 15, wherein the partly isolated network slice with radio access network and access and mobility management function shared is both the radio access network and access and mobility management function belonging to an isolated network slice instance that can be seen from the outside of the isolated network slice instance.

17. The method of claim 1, wherein the network slice is isolated from one or more other network slices, when the network slice is fully isolated or partly isolated from the one or more other network slices.

18. The method of claim 1, wherein the network slice is isolated from one or more other network slices, when the network slice is logically isolated or physically isolated from the one or more other network slices.

19. The method of claim 1, wherein the network slice isolation information comprises a network slice instance identifier of the network slice.

* * * * *